(12) United States Patent
Bell

(10) Patent No.: US 12,082,072 B1
(45) Date of Patent: Sep. 3, 2024

(54) APPARATUS, SYSTEM, AND METHOD OF MONITORING LOCATION COMMUNICATION AND PRIVILEGES

(71) Applicant: Deborah Bell, Scottsdale, AZ (US)

(72) Inventor: Deborah Bell, Scottsdale, AZ (US)

( * ) Notice: Subject to any disclaimer, the term of this patent is extended or adjusted under 35 U.S.C. 154(b) by 446 days.

(21) Appl. No.: 17/331,595

(22) Filed: May 26, 2021

Related U.S. Application Data

(60) Provisional application No. 63/030,951, filed on May 28, 2020.

(51) Int. Cl.
 *H04W 4/029* (2018.01)
 *H04W 4/021* (2018.01)
 *H04W 8/30* (2009.01)

(52) U.S. Cl.
 CPC .......... *H04W 4/029* (2018.02); *H04W 4/021* (2013.01); *H04W 8/30* (2013.01)

(58) Field of Classification Search
 CPC ......... H04W 12/06; H04W 4/02; H04W 4/24; H04W 84/12; H04W 4/20; H04W 12/00; H04W 12/02; H04W 12/08; H04W 12/37; H04W 4/50; H04W 48/14; H04W 48/16; H04W 8/02; H04W 8/18; H04W 4/21; H04W 4/029; H04W 4/021; H04W 8/30; H04W 4/08; G06Q 50/01; G06Q 30/02; G06Q 20/321; G06Q 30/0261; H04L 67/306; H04L 63/08; H04L 9/32
 See application file for complete search history.

(56) References Cited

U.S. PATENT DOCUMENTS

| | | | |
|---|---|---|---|
| 7,330,122 B2 | 2/2008 | Derrick et al. | |
| 7,545,318 B2 | 6/2009 | Derrick et al. | |
| 7,737,841 B2 | 6/2010 | Derrick et al. | |
| 7,804,412 B2 | 9/2010 | Derrick et al. | |
| 7,936,262 B2 | 5/2011 | Derrick et al. | |
| 8,013,736 B2 | 9/2011 | Derrick et al. | |
| 8,031,077 B2 | 10/2011 | Derrick et al. | |
| 8,232,876 B2 | 7/2012 | Derrick et al. | |
| 8,514,070 B2 | 8/2013 | Roper et al. | |

(Continued)

FOREIGN PATENT DOCUMENTS

CN             103792559 A   *   5/2014  ........... H04W 4/029

OTHER PUBLICATIONS http://e-cell.com/; (see 01_e-cell.pdf filed herewith); published at least as early as Aug. 9, 2021.

(Continued)

*Primary Examiner* — Nizar N Sivji
*Assistant Examiner* — Jing Gao
(74) *Attorney, Agent, or Firm* — Aronberg Goldgehn Davis & Garmisa

(57) ABSTRACT

The present system provides for the monitoring of a mobile device as a proxy for the location of a client. A client downloads the Vcheck application to a mobile device. The client is provided with an account on the Vcheck platform that is linked to the Vcheck application. An agent is provided with an account on the Vcheck platform and the client account is linked to the agent account. The agent may set client parameters and the Vcheck platform monitors the parameters through the data from the Vcheck application and coordinates communications between the agent and client to confirm the client is in compliance with the client parameters.

16 Claims, 39 Drawing Sheets

(56) References Cited

U.S. PATENT DOCUMENTS

| | | | |
|---|---|---|---|
| 8,797,210 | B2 | 8/2014 | Derrick et al. |
| 9,129,504 | B2 | 9/2015 | Oliphant et al. |
| 9,491,289 | B2 | 11/2016 | Derrick et al. |
| 9,706,403 | B2 | 7/2017 | Torgersrud et al. |
| 10,255,789 | B2 | 4/2019 | Keyton |
| 10,609,336 | B2 | 3/2020 | Kingery |
| 11,050,278 | B1* | 6/2021 | Townsend, III ........ G06F 21/35 |
| 2016/0309122 | A1* | 10/2016 | Kingery ................. H04W 4/60 |
| 2020/0334968 | A1* | 10/2020 | Manne ............... G08B 21/0261 |

OTHER PUBLICATIONS https://bi.com/products-and-services/smartlink-offender-monitoring-mobile-application-software/; (see 02_BI_Incorporated.pdf filed herewith); published at least as early as Aug. 9, 2021.

https://www.trackgrp.com/wp-content/uploads/2020/02/InTouch_Flyer_0719_FCG.pdf; (See 03_InTouch_Flyer_0719_FCG.pdf filed herewith); published at least as early as Aug. 9, 2021.

https://tracktechllc.com/products/; (See 04_Products—TRACKtech.pdg filed herewith); published at least as early as Aug. 9, 2021.

https://www.scramsystems.com/monitoring/scram-touchpoint/; (See 05_SCRAM_TouchPoint.pdf filed herewith); published at least as early as Aug. 9, 2021.

https://www.attentigroup.com/products/em-manager/; (See 06_solutions_Archive-Attenti_US.pdf filed herewith); published at least as early as Aug. 9, 2021.

https://prontotrak.com/electronic-monitoring/securus-enrollink/; (See 07_SECURUS_ENROLLINK-Prontotrak.pdf field herewith); published at least as early as Aug. 9, 2021.

https://www.socrates-software.com/socrates-360/; (See 08_Socrates360-Socrates_Software.pdf field herewith); published at least as early as Aug. 9, 2021.

https://www.supercom.com/hls; (See 09_HLS_supercom.pdf filed herewith); published at least as early as Aug. 9, 2021.

https://reconnect.io/; (See 10_Reconnect _ Fighting_recidivism_incarceration_and_addiction.pdf, filed herewith); published at least as early as Aug. 9, 2021.

https://courtfact.com/; (See 11_Court_Fact_Success_in_the_Palm_of_Your_Hand.pdf filed herewith); published at east as early as Aug. 9, 2021.

https://corrisoft.com/; (See 12_Corrisoft-Correctional_Software-On_One_Comprehensive_Platform.pdf filed herewith); published at least as early as Aug. 9, 2021.

https://www.sentineladvantage.com/; (See 13_Acivilate.pdf filed herewith); published at least as early as Aug. 9, 2021.

https://www.shadowtrack.com/technology/; (See 14_Technology-Shadowtrack.pdf filed herewith); published at least as early as Aug. 9, 2021.

htttps://osmnow.com/images/prodsheet.pdf; (See 15_prodsheet.pdf field herewith); published at least as early as Aug. 9, 2021.

https://www.gtl.net/correctional-facility-services/communication-solutions/; (See 16_Communication_Solutions_GTL.pdf filed herewith); published at least as early as Aug. 9, 2021.

* cited by examiner

Remain still.

Say your full name. ← 2201

2301

Say your location.

Say the word - Bluebird. ← 2401

2501
VCheck sent.

FIG. 30

APPARATUS, SYSTEM, AND METHOD OF MONITORING LOCATION COMMUNICATION AND PRIVILEGES

CROSS-REFERENCE TO RELATED APPLICATIONS

This application claims priority to U.S. Provisional Patent Application No. 63/030,951 filed on May 28, 2020, the entirety of which is incorporated herein by this reference for all purposes.

BACKGROUND

There are a number of reasons that a person may require that their location be monitored. For example, when a person commits a criminal offense, a part of their sentence may involve some level of third party monitoring. A person may be sentenced to jail for a period of time, then be released on the condition that the person remain in the municipality where they reside. The release conditions may have exceptions, such as traveling outside the municipality for work, or being permitted unrestricted travel during the day so long as the person returns home by a particular time at night. To ensure compliance with the terms of the release, the person (or client) may be assigned to an agent, such as a parole officer for example, who monitors the client's activity.

Agents may be assigned hundreds of clients to monitor and it is not practical for the agent or the client to meet in person to perform check-ins and ensure compliance. Thus, agents have relied on virtual means of monitoring clients. For example, agents have required clients to wear an electronic monitoring device, such as an ankle bracelet. Such devices, however, are locked onto a person and cannot be removed without damaging them or removal by the agent. They also carry a societal stigma that may be desired by the agent for some clients, but in other circumstances may be a punishment unfit for the crime. Other systems include monitoring a person's mobile device, or requiring a person to check-in by phone. However, the client can easily forget, or intentionally leave behind, a mobile device to fake their whereabouts, and it may be difficult for an agent to accurately rely on personal knowledge of a person's voice to ensure the person calling to check-in actually is the client. Alternately, a client can simply lie about their location when checking in by phone.

Additional problems with currently available systems for monitoring and checking in include that while it may be desirable to restrict a person's movement, it may not be possible to pre-identify all locations that a person may need to go, or be allowed to go, when a location monitoring restriction is initially set up. It is also difficult and overly constraining to try and predict the amount of time that it may take a person to travel from one permissible zone to another. Nor is it practical to mandate a particular route for the person to take given that there may be any number of unidentifiable obstacles preventing a particular route (such as an accident, flooding, construction detours, the need to get gas, etc.). It is insufficient simply to include intermittent or near continuous GPS tracking, because that may lead to unnecessary false alarms. It is also an unnecessary burden to require the client to login and update their position when they believe they are within the proper geographic zone. The system must be adaptable to accommodate different permissible locations, but not always require the client to check-in manually. Also, there is a problem that sometimes there is no signal connectivity, and therefore a client may not get credit for being in the correct location, even though they were there.

Continual tracking of clients to ensure that they comply with imposed restrictions (for example, a court order, government order, doctor's order, parental order, etc.) may be desirable, but it has been found to be impractical for an individual's device to literally continuously send and receive location data because it drains the battery too quickly. The person may also unintentionally be in a location where no cellular or wi-fi signal is available, or has where the client's device otherwise experiences a loss of transmission signal capabilities.

With prior systems, when a client moves in and out of zones, the client may not necessarily be aware that they have crossed the threshold of the zone. Also, the client may forget to properly check-in upon arriving at a new zone. In either case, the client may not receive appropriate credit for being in the proper zone. Alternatively, the client may not want to check-in when outside of a zone, but the agent would not know of the transgression unless the agent gets an alert.

Prior systems are also restricted to defining a client's behavior by specific geographic locations. The client's restrictions are focused solely on information and criteria of the client without accounting for activity by a third party. However, often times, clients' offenses result in the need for monitoring the clients' association with others, such as other offenders or victims. Such may be the case with repeat drug offenders or abusers. It is desirable to limit client's access and interaction with such individuals, but prior systems provide no mechanism for reliably preventing the client and other third parties from overlapping in their locations or notifying an agent of such an overlap if one occurs.

Prior systems also rely on a ridged check-in schedule. But such typical check-in schedules' inflexibly require a client to check-in according to the officer's set schedule. If the client misses the check-in, whether through their own fault or through unforeseeable circumstances, there are consequences, sometimes unjustifiably.

Some prior systems generate a log of where an individual was over a given period of time, or may simply report the path that the individual followed. However, such logs or reports do not detail how much time an individual spent at a particular location. Thus an agent is left with an incomplete picture of the client's actual behaviors.

Communications in prior systems are generally accomplished through text messages, emails, and phone calls. However, such systems require the agent and client to exchange personal information, or at least information that directly links the two individuals. For example, in prior systems, an agent text messaging a client would require the client's personal phone number, and then the client would receive the agent's phone number upon receipt of the message. There is also no reliable way for the agent to confirm that the client received, read, and understood the message.

Agents are often tasked with monitoring hundreds of clients. It is therefore impractical for the agent to personally identify each client. Even requiring the agent to personally cross-reference client information for each client interaction or check-in creates a substantial burden on the agent.

Thus, there is a need for an apparatus, system, and method for discretely monitoring a person such that the agent can monitor a large quantity of individuals simultaneously and with certainty that each client's monitoring terms are satisfied at check-ins.

SUMMARY

The present system generally relates to monitoring individuals. The system connects a client's mobile device, such as a mobile phone, to an agent's database and database management system, which comprises one or more computer programs. In one embodiment the agent database and database management system is operated on internet connected servers, such that the program runs and it accessible in the cloud. The database and database management system is collectively referred to herein as the Vcheck platform. It should be understood that references to information uploaded to the Vcheck platform, downloaded from the Vcheck platform, or stored on the Vcheck platform means data that is stored on a computerized device that also operates the database and database management system (for example, one or more servers). The agent utilizes the Vcheck platform to coordinate client parameters for the client and to conduct check-ins with the client. For example, the agent may have a work station comprising a PC, tablet, or mobile device, with internal non-transitory memory having stored thereon executable code that, when executed, allows the agent to interface with the Vcheck platform. As used herein, the agent's device is considered to be part of the Vcheck platform. The database management system of the V-check platform includes a computer program that may be stored locally on an agent's device, or hosted on cloud servers to provide an agent interface, or dashboard (such as a GUI), for the Vcheck platform and it is utilized by the agent (and client via the Vcheck app) to perform check-ins, coordinate the parameters of the client's monitoring (i.e. data relating to any required or prohibited activity imposed on the client)—referred to herein as client parameters—and monitor the client's mobile device as a proxy for the client's actions. The Vcheck platform dashboard viewable to the client may be different than the dashboard viewable to the agent, and each of the client and agent may have different read/write capabilities. Thus, a client may view a client dashboard of the Vcheck platform on the client's device through the Vcheck app while an agent may view an agent dashboard of the Vcheck platform on the agent's device.

The client has an account on the Vcheck platform that stores pertinent information about the client and the client parameters. The client's mobile device runs the Vcheck application (a.k.a. the Vcheck app) which is a computer program stored on the client's mobile device. The Vcheck app may run in the foreground to provide the client with an interface with the Vcheck platform, and by run in the background of the client's device to communicate with the Vcheck platform, such as by sending and receiving data through a wi-fi signal or mobile network. The Vcheck platform utilizes the data received to check whether the client is in compliance with the client parameters. The agent utilizes a user interface operating on the agent's device to connect to the Vcheck platform to monitor the client's activities as reported through the Vcheck platform's communications with the client.

Additionally, the present system may utilize geofences as part of the client parameters. The client parameters may be set to identify zones of interest that, for example, a client may enter, may not enter, or must occupy or must not occupy at specific times. In the event that the client's mobile device is not in compliance with the parameters of a particular zone of interest, the Vcheck platform may generate an alert. The alert may be sent to one or both of the client and the agent.

In an embodiment, the Vcheck platform supports check-ins between the client and agent. For example, at an appointed time, or as prompted by the agent, the client may conduct a check-in. The client utilizes the client's mobile device to access the Vcheck app and conduct the check-in. The client may be required to provide verification information, such as a password or biometric data, and may be required to provide video verification, which may then be transmitted to the Vcheck platform. The Vcheck app may also link the client to the Vcheck platform and agent for a live check-in, for example through formulating and hosting a video chat which may be recorded as a check-in. Check-ins are stored on the Vcheck platform and may be accessed at a later date by an agent. The agent may then utilize data received by the Vcheck platform from the client mobile phone to confirm the accuracy of check-in. For example, the Vcheck platform may collect location information, biometric data about the client, and audio/video (collectively, video) and that data may be cross-referenced by the Vcheck platform to confirm compliance with the terms of parole. In the event of non-compliance the particular offense may be highlighted or called to the attention of the agent, for example, as a pop-up or an alert message to the agent. The agent may review the check-in and confirm the accuracy or conduct and ad hoc check-in with the client. The communications and client profiles are all stored on the Vcheck platform to provide a complete log of the client's information and check-ins, which the agent may then access and utilize with confidence in the accuracy of the information because it is stored independent from access by the client.

BRIEF DESCRIPTION OF THE DRAWINGS

FIG. 2 is a further example of a landing page for an agent account on the Vcheck platform accessible by agents through the agent dashboard.

FIG. 3 is an image of an embodiment of the Vcheck platform display of a clients page listing clients assigned to an agent.

FIG. 20 is an image of an embodiment of the Vcheck app check-in process for beginning a client check-in.

FIG. 21 is an image of an embodiment of the Vcheck app check-in process for capturing client information for a client check-in.

FIG. 22 is an image of an embodiment of the Vcheck app check-in process for capturing client information for a client check-in.

FIG. 23 is an image of an embodiment of the Vcheck app check-in process for capturing client information for a client check-in.

FIG. 24 is an image of an embodiment of the Vcheck app check-in process for capturing client information for a client check-in.

FIG. 25 is an image of an embodiment of the Vcheck app check-in process for capturing client information for a client check-in.

FIG. 30 is an image of an embodiment of the Vcheck platform's display of client information associated with the Vcheck platform's report generation feature.

FIG. 33 is a flowchart of an embodiment of the present system's performance of a random check-in.

FIG. 34 is a flowchart of an embodiment of the present system's performance of a zone-triggered check-in.

DETAILED DESCRIPTION OF EMBODIMENTS

Figure 1:
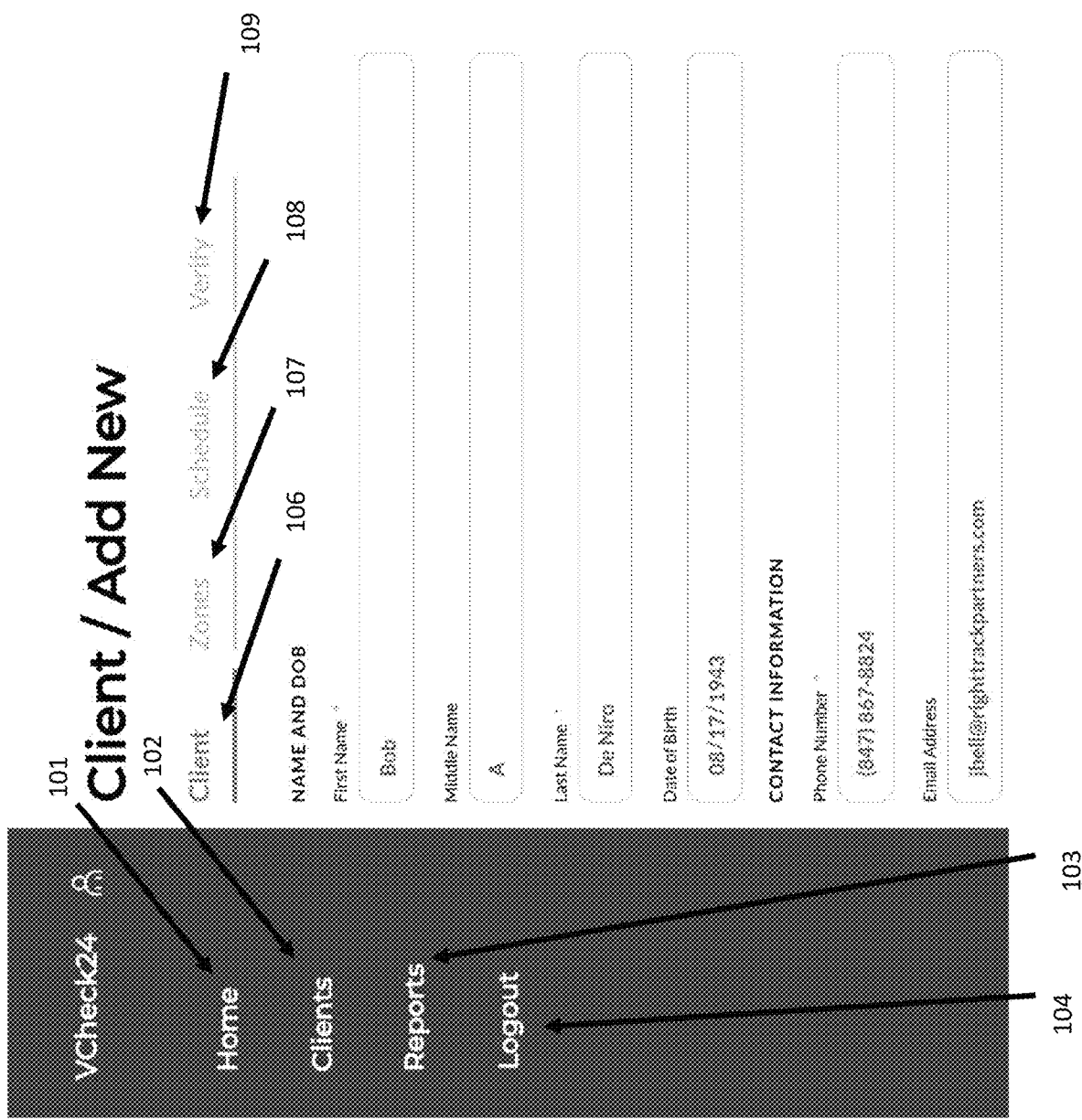
FIG. 1 is an example of a landing page for an agent account on the Vcheck platform accessible by agents through the agent dashboard.

Embodiments of the present invention are described with reference to the drawings below. In the drawings, like numbers are used to refer to like elements. As used herein, unless otherwise stated, "and" is conjunctive, while or is disjunctive and conjunctive such that the condition "A or B" is satisfied by any of "A" alone, "B" alone, and "A and B" together.

The Vcheck platform comprises an interactive computer implemented system and database. It coordinates the communications between a client and an agent to facilitate a client's compliance with mandated conditions (for example, court ordered parole conditions). While the system is described herein with respect to the interactions between a single agent and a single client, it should be understood that the system accommodates a plurality of clients and a plurality of agents and that a single agent may utilize the system to interact with a plurality of clients. Additionally, in one embodiment, each client is assigned a primary agent and a back-up agent. The Vcheck platform may automatically transmit client data (such as messages, alerts, or check-ins) to both the primary and secondary agents, which helps ensure that the information is recognized by a monitoring agent in a timely manner.

In one embodiment, the Vcheck platform is stored and operates from one or more cloud based servers. Clients download a mobile application (a Vcheck app) to a mobile device (for example, a mobile phone, tablet, etc.). The Vcheck app provides a portal for the client to send and receive data from the Vcheck platform and provides a client-side user interface to allow the client to view the client's account. In one embodiment, the client is provided with a code that uniquely links one copy of the Vcheck app to a single client device and to a single client account on the Vcheck platform. Once the client Vcheck app is linked to the client account on the Vcheck platform using the code, the Vcheck platform prohibits any other copy of the Vcheck app from linking to or accessing the client account. Thus, one client may only operate the Vcheck app (and thus access the Vcheck platform) from a single device. That deep linking enrollment ensures that the client's movements and check-ins are tied to one single device. The Vcheck platform segregates clients into client accounts such that all of a one client's pertinent information is linked with that client's client account. For example, the client account may store the client's name, contact information, picture, biometric identifiers (e.g. finger print, voice ID, retina or iris print, image of facial features for facial recognition, or other biomarkers), calendar, assigned agent contact information, messages, check-ins, and supervision conditions. The client account may further include a virtual file cabinet for storing relevant documents or files. The client may use the Vcheck app to interact with the Vcheck platform, and by extension, the client account and the information contained therein.

An agent may utilize an agent program to similarly access the Vcheck platform. While it is contemplated that the agent program could be a similar app that operates on a mobile device, in one embodiment, for example, the agent program is a computer program stored on a personal computer. The agent uses the computer to execute the agent program which provides the agent with user interface for an agent portal. The agent portal may be in the form of a dashboard that links the agent to the Vcheck platform and allows the agent to access client accounts, and by extension, access clients. For example, the agent may use the agent portal to identify Client A in the Vcheck platform database. The agent may then access Client A's account through the Vcheck platform to, for example, change Client A's calendar with a new check-in time, or upload a document to Client A's file cabinet, or download a document from Client A's cabinet, or transmit a message to Client A to perform or start a video check-in. Thus, the client's pertinent information is stored on the Vcheck platform and is linked to the client's account and accessible by the agent.

The Vcheck platform includes a number of functionalities for facilitating the check-in process and ensuring compliance with monitoring terms.

In one embodiment, the Vcheck platform performs near continuous tracking of clients. A client is linked to the Vcheck platform through the client's mobile device running the Vcheck mobile application. The mobile application may run in the background of the client's phone. The phone and Vcheck platform communicate periodically to perform location checks. For example, the Vcheck platform may gather GPS data at approximately 3 minute intervals which provides for a usable approximation of continuous location of a client. The Vcheck platform processes the data collected at the intervals and extrapolates the locational information to confirm that the client remained within a designated area at all times (or remained out of restricted areas).

Clients may also be required to check-in at particular times. However, if the device loses cellular or internet network, such as wi-fi, connectivity (for ease of reference, collective referred to as a connection to a cellular tower) at a time when check-in is required, that loss (or inability to connect) is logged and later reported. For example, when a phone transitions from normal connectivity to "roaming" the loss of connectivity may be logged. That is, the occurrence of cell tower signal loss is stored locally on the client device along with relevant identifying information (such as date and time). At the same time, so long as GPS data is still available (e.g. the phone remains connected to satellite data), the GPS location data and relevant identifying information is also logged locally (for example according to the standard 3 minute interval of data collection). When cell tower connectivity is restored, the logged data is uploaded to the cloud and the Vcheck platform is populated with the logged data. The agent may then review the uploaded logged data to confirm that the client complied with the client's check-in obligations. Breaks in GPS location may be interpolated by the Vcheck platform to fill in any losses in location data. The system may also log locally any time the client changes the location detection service of the Vcheck app off, such as by creating and saving a log as part of the Vcheck app changing its operating parameters.

In one embodiment, when the Vcheck app is enabled, the Vcheck app accesses the phone's settings to determine if GPS data (or other location monitoring data) is enabled. If it is not, the Vcheck app prompts the client to enable the gathering of GPS (or similar) data. The Vcheck app monitors the GPS function of the client's device (or similar location monitoring function). In the event that the client disables the GPS (or similar) function, the Vcheck app stores the date and time and identity of the function being disabled as disable data and automatically transmits an alert message (which may be the disable data alone or together with an additional message) to the Vcheck platform, which may log the change event or further transmit an alert to the agent. If the mobile device is not connected to a network (e.g. cell tower or wi-fi), or if the client disables the network connection, the Vcheck app stores the disable data and periodically checks for the signal connectivity. When connectivity is restored, the disable alert message is sent to the Vcheck platform. The Vcheck app may similarly record enable data corresponding to when the function that was disabled is enabled again, and the Vcheck app may transmit the enable data to the Vcheck platform.

Figure 35:
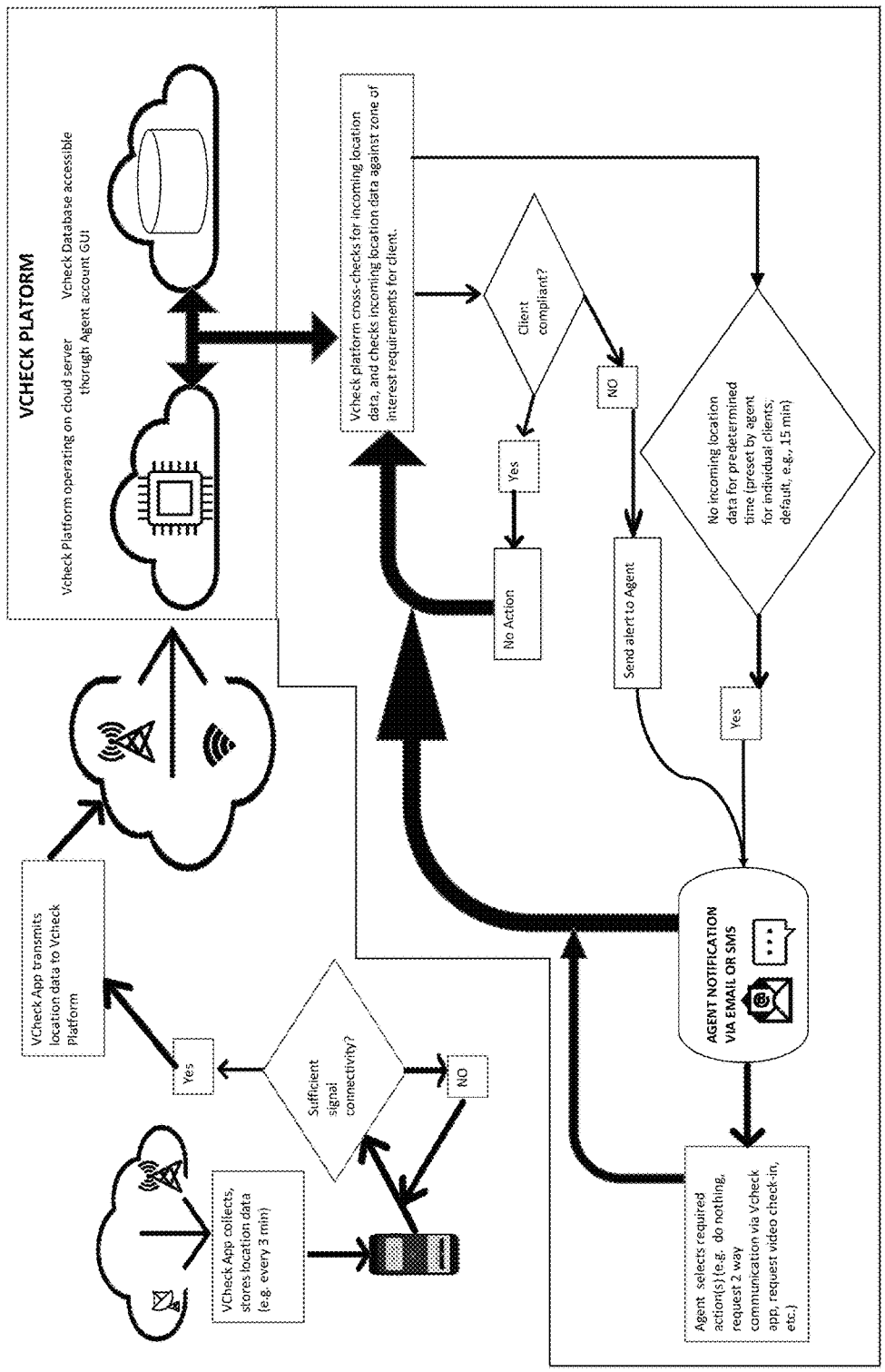
FIG. 35 is a flowchart of an embodiment of the present system's collection and monitoring of the location data corresponding to the client device.

Additionally, even where there is no cell, network, or GPS connectivity, the client may perform a video check-in. The video check-in is performed on the client's device and the Vcheck app date and time stamps and saves the check-in locally for upload to the cloud and into the Vcheck platform upon reconnecting with a cell tower. The Vcheck platform may monitor the substance of incoming data and its frequency. In one embodiment, the Vcheck platform includes set trigger points for breaks in frequency continuity. For example, if there has been no automatic location data (or other contact from the client Vcheck app) for an extended time (for example more than one hour), the Vcheck platform generates an alert, which may be displayed on the agent's dashboard, emailed, texted, or otherwise sent to the agent according to the agent's settings. If the client transitions to or from a zone of interest, the Vcheck platform may generate an alert to the agent or generate an alert to the client to perform a check-in. One example of the present system's monitoring of client location data is set forth in the flowchart of FIG. 35.

In one embodiment, at the time the client sets up the client account, the client may use the Vcheck app to input biometric data, for example image of the client's face for facial recognition comparisons. As part of a check-in, the client may later be required to submit corresponding biometric data to be used to confirm the client's identity. When a client performs a check-in, the check-in may compare the biometric data provided by the client at the time of the check-in to the previously stored biometric data. The client's check-in and biometric confirmation is transmitted to the Vcheck platform. If the biometric data is rejected, the agent's dashboard may be updated to show the client's check-in and an indication of the biometric failure. The biometric data failure may further trigger the Vcheck platform to generate an alert to the agent. Thus, an agent monitoring many clients is able to focus in on those check-ins where there is a disconnect with the biometric data and review the video check-in to determine whether the client appropriately checked in or not.

Figure 34:
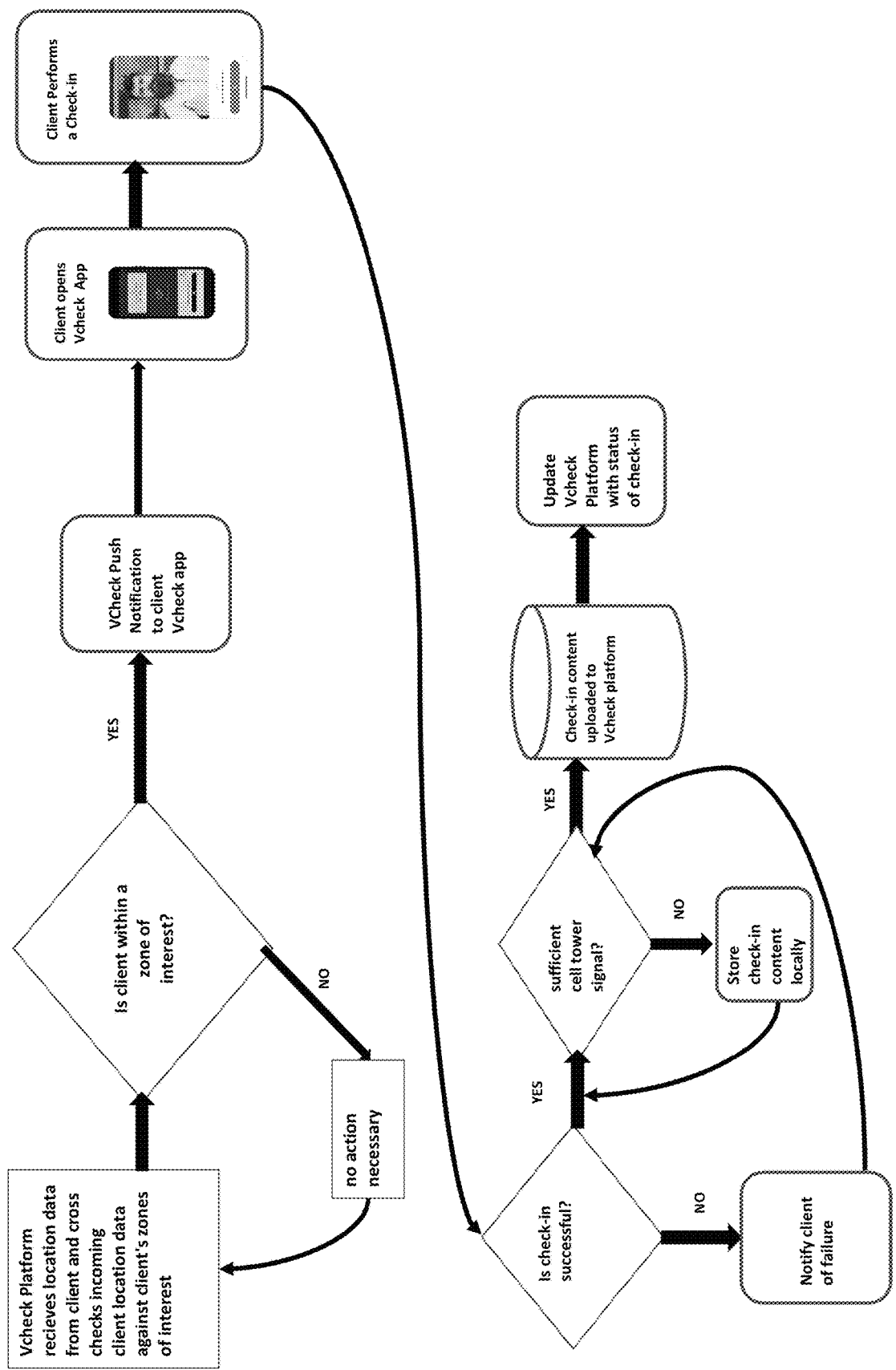
Figure 36:
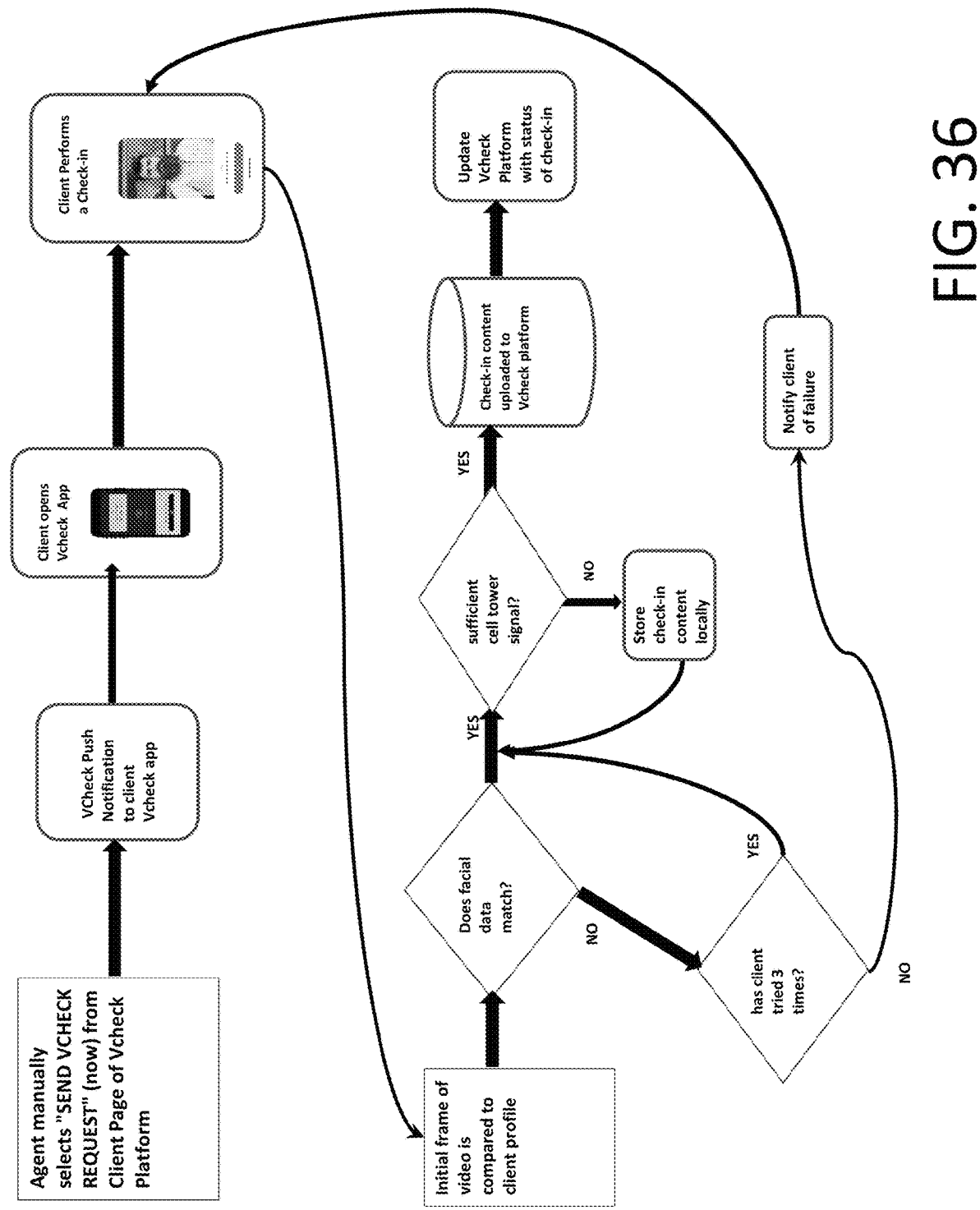
FIG. 36 is a flowchart of an embodiment of the present system's use of ad hoc check-ins in conjunction with a biometric requirement.

As noted, the Vcheck platform may store biometric data associated with a client. For example, the client profile may include one or more images of the client's face which the Vcheck platform may use for facial recognition. It should be appreciated that any of the client check-ins (e.g. zone triggered, random, scheduled, requested by an agent, etc.) may include a requirement that the client provide biometric input as part of the check-in procedure. FIG. 36 provides an example of an ad hoc check-in requested by an agent. The agent selects to send a message through the Vcheck platform requesting that the client perform a check-in and the Vcheck platform routs the message to the client. The client opens the Vcheck app on the client's mobile device and begins the check-in procedure. The Vcheck app uses an image captured from the client's device (for example, the first frame of a video check-in) and performs a facial recognition comparison. If the comparison matches, the facial recognition confirmation is transmitted to the Vcheck platform. That may be done serially or parallel with the client performing a full video check-in, for example a check-in as set forth in FIG. 34. If there is insufficient signal to transmit the check-in, the Vcheck app stores the check-in locally and continues to check for signal. When sufficient signal is present, the Vcheck app transmits the check-in to the Vcheck platform which then updates the client's status. In the event that the biometric confirmation fails, in one embodiment such as is shown in FIG. 36, the client is provided with another opportunity to perform the check-in and is notified of the failure. If the client fails too many times, such as three times, the Vcheck app transmits an indication that the check-in failed to the Vcheck-platform.

In one embodiment, the Vcheck app monitors the internal clock of the client's mobile device and cross references that time with a locally stored calendar for requiring a client to check-in. The locally stored calendar may be synched and slaved to the Vcheck platform, such that when there is a change on the Vcheck platform, and the Vcheck app is in communication with the Vcheck platform, the locally stored calendar will be updated to conform to the Vcheck platform. In normal operation, the Vcheck app remains connected to the Vcheck platform, and the Vcheck platform pushes notifications (such as a notification to perform a check-in) to the Vcheck app based on a calendar stored on the Vcheck platform. However, the Vcheck app may be set to fall back to providing alerts to the client based on the locally stored calendar in the event of a loss of signal connectivity with the Vcheck platform. Thus, when alerts are not available from the Vcheck platform due to a loss of connectivity, the Vcheck app may issue a prompt to the client device to conduct a check-in based on the locally stored calendar.

In one embodiment, the Vcheck platform monitors a clock, such as an internal clock of one of the servers running the Vcheck platform, and cross-references that with the Vcheck platform's calendar of check-in times for a client. In the event that a check-in is not received at an expected time (or within a short span of an expected time to allow for delays in transmission, such as 0-5 min), the Vcheck platform logs the time of the missing check-in. The Vcheck platform may further alert the agent of the missed check-in. When the client's Vcheck app uploads logged check-ins, the Vcheck platform cross-references the time-stamps of the client check-in with any missing check-in, and where the two sufficiently overlap (for example each occurred with 0-5 min) the Vcheck platform automatically resets the check-in notification (for example, changing the notification status from "missing" or "late" to "timely" or "timely-delayed"), may augment that notification with a note reflecting that the check-in was accompanied by data indicating signal loss at the original time of the check-in, and may eliminate any outstanding alerts to the agent.

Accordingly, the present system may operate to continuously track the individual's device whether or not the client's Vcheck app is running in the foreground or background. In one embodiment, when a client opens the Vcheck app such that the Vcheck app is running in the foreground, the client may check-in and perform other functions. However, when the user elects to close the Vcheck app, the Vcheck app does not entirely close. Rather, it merely reduces its functional processing, but remains active in the background. In one embodiment, the Vcheck app gathers location data according to a base frequency that is the highest frequency programmed into the Vcheck app. In one embodiment the base frequency is approximately every three minutes (i.e. within a few seconds of three minutes).

Generally, it is assumed that the user device will have sufficient signal connectivity at all times, and thus the Vcheck app will transmit the location data every 3 minutes as well. However, in the event of a loss of signal, the Vcheck app may store the location data gathered during the signal loss period, and then transmit all of that gathered location data once the signal connectivity has been restored. Thus, so long as the individual device is capable of receiving a location data signal (for example, the phone is not turned off), the Vcheck app will continue to gather that data. Additionally, even where the client device has lost communication with the Vcheck platform (whether intentionally or not), the Vcheck platform maintains the calendar of required check-ins, the schedule for random check-ins, and issues alerts to the Vcheck app all independently from the operation of the Vcheck app and client device. When the client device regains signal, the Vcheck platform's alerts (which will already have been authorized for transmission, for example via email, text, direct message, or through the Vcheck app) will be pushed to the client device by the associated message system's protocol as well as being saved on the Vcheck platform.

Based on client device motion activity, the system can dynamically modify collection timing based on device positioning overtime. That is, if the client device has not been moved for an extended time (for example the device's location is completely stationary or has remained within a set geographic zone for 30 minutes), the frequency of the collection interval is decreased (such as to every 8-10 minutes) under the assumption that the device will remain stationary for the foreseeable future. That saves battery and processing power by not needlessly collecting the same positioning data repeatedly. The system can set the threshold value for "movement" that would trigger the system to increase its collection interval as well. Generally, for example, a Zone of Interest (that is a geofence established for a client corresponding to a particular location area) may be centered on a person's house or yard and may be approximately 200 meters in radius. The Vcheck platform includes a counter that increments with successive in-zone location readings. Thus, when successive data readings (the number of which may be set by the agent) indicates that the device has not moved outside of the zone of interest, the system will decrease the frequency of gathering data under the assumption that the client is at home and likely remaining at home even though the client may be moving around with the device within the home. The agent is able to enable or disable the modification of collection timing through the Vcheck platform, which sends the instruction to the Vcheck app. That way the Vcheck app does not provide the client with information about the frequency of data collection, preventing the client from taking advantage of delays in data collection. Thus, for low risk clients, the agent may allow dynamic modification collection, but for high risk, less trustworthy clients, the agent may force the Vcheck app to constantly collect data at the highest frequency available.

The agent may assign Zones of Interest to a client. A zone of interest may be a geofenced area that is pertinent to the client's movement. For example, a zone of interest may be an area that a client is ordered to be within during a particular time (such as a home at curfew or work location between 9 am and 5 pm), an area that the client is restricted from entering (such as due to a restraining order or travel restriction), or simply an area that the agent has defined as one that the agent wants to receive an alert about if the client enters or exits it (such as an airport). Generally, the zones of interest are areas that a client is expected to (or not to)

occupy for non-transitory periods of time. One zone of interest may be a residence as described above. An agent may set the parameters for a zone of interest using the Vcheck platform, such as by identifying an address (GPS location), a circumference of a certain radius (or alternatively some polygonal shape) around the address, and in some instances one or more of a day of the week, date, and time frame. A Client may be assigned multiple zones of interest. For example, a client may be assigned areas associated with home, work, school, treatment facility, court, etc. These are examples of permitted or inclusion zones, which are areas the client is expected to occupy. The Vcheck platform monitors the parameters of the inclusion zone (e.g. geographic area, date, and time) and may compare it to the clients location data to determine if or when the client enters or exits the inclusion zone. If the client is in compliance with the inclusion zone, the Vcheck platform need not issue an alert. If the client is not in compliance, the Vcheck platform may issue an alert to the agent or client.

Another type of zone of interest is an exclusion zone. An exclusion zone is a zone of interest area that a client is restricted from entering. For example, if the client is subject to a restraining order, the client may be prohibited from entering a circumference with 1000 meter radius centered on an ex-spouse's residence. The agent can use the Vcheck platform to set parameters for the exclusion zone in the same way that the agent assigns permissible zones of interests. In either case, the Vcheck platform monitors the location data provided from the client device, cross-references it with the parameters defining the zones of interest associated with the client and, when the cross-reference indicates that the client transitioned (for example, successive location transmissions indicate that the client moved into or out of a zone of interest), the Vcheck platform may generate an alert to notify the agent of the transition. When defining the zones of interest for a client, the agent may use the Vcheck platform to select the frequency and type of alert, such as a general notification sent only to the agent, a general notification to both the agent and the client, or a notification to the agent and an alert to perform a check-in to the client.

In one embodiment, when the client enters the zone of interest, the Vcheck platform logs the entry as a check-in for the zone. The check-in may be accomplished by the user device transmitting a message to the Vcheck platform or the Vcheck platform may cross-reference the location data received from the client device with the Vcheck platform's database of zones of interest to determine that the client is within the zone of interest and thereafter log the entry as a check-in.

In one embodiment, when a client enters a zone of interest, the client device automatically prompts the client to perform a check-in. The check-in comprises the client using the mobile device to take a video recording of their face which is uploaded to the Vcheck platform. The video recording may include the client reciting their current location, and their name. The agent may assign the client further requirements, such as reciting the purpose of the client being at the zone, or the estimated time the client intends to stay in the zone. While performing the video check-in, the mobile device may further prompt the client to perform an action. For example, the mobile device may prompt the client to blink twice or show their profile, or the device may provide random numbers or words that the client is prompted to repeat.

In one embodiment, a client may enter a zone of interest, and the mobile device may provide an initial notification that the client has properly entered a zone. For example the Vcheck app confirms the client is in a proper zone at a proper time provides a notification (e.g. message, alarm, haptic feedback) that the client is in compliance with the zone parameters. This provides the client with an initial indication that they are in compliance with the client parameters. Client parameters comprise data corresponding to a required check-in such as the date, time, and acceptable locations for a check in, whether the check-in is random or scheduled, and the type of check-in required (such as call, text, video, biometric data requirement). The Vcheck app may also consistently, randomly, or according to preset schedules provided by the agent, prompt the client to perform a check-in, such as by generating a message/issuing an alarm on the mobile device and beginning a countdown timer (for example 5 minutes for the completion of the check-in). For example, for reliable clients, an agent may use the Vcheck platform to randomly require full video check-ins, but for less reliable clients, the agent may use the Vcheck platform to require full video check-ins every time the client enters a zone. In that way, the system automatically logs the client as being in the correct zone as soon as the client device is able register crossing the threshold, but the client is permitted leeway in confirming their identity through the video check-in process.

To check-in, the client opens the Vcheck app and selects the check-in option. The mobile device may then begin a video recording (which may be recorded on the phone and then uploaded to the Vcheck platform or streamed directly to the Vcheck platform and recorded in the cloud). The Vcheck app may prompt the client for information (i.e. name, address, etc.), and prompt the client for action (e.g. scan finger print, or iris, or other biomarker or identification, or repeat words or phrases). In one embodiment, as part of the check in, the Vcheck app automatically captures biometric data for use in performing an automated biometric comparison by the Vcheck platform. The data gathered during the check-in (e.g. video, audio, scans, location, time, etc.) is uploaded to the Vcheck platform and the Vcheck platform cross-references it with the client's account information requirements to confirm compliance. If in compliance, the mobile device indicates that the check-in was successful. If not in compliance, the mobile device may indicate the problem and prompt the client to repeat the check-in or simply notify the client of the failure. In instances where there is insufficient signal to upload the check-in, the Vcheck app may indicate the lack of signal to the client, store the check-in and upload it upon gaining sufficient signal, at which point the Vcheck app provides the client with an indication of the success/failure of the check-in. The Vcheck platform correlates the delayed receipt of the check-in with the data provided and saved during the check-in to determine whether the performance of the check-in was timely. The Vcheck platform may then log the check-in and note whether the check-in was timely, delayed, delayed but timely, or untimely. Thus, the system is able to perform check-ins asynchronously but register and log the check-ins as if they were received in real-time.

The agent may select to have the Vcheck platform simply log the check-in or send the agent a message indicating a successful or unsuccessful or missing check-in. An agent may further access the recorded check-ins through the Vcheck platform to perform spot-checks or for other purposes. In one embodiment, when the client is in a zone of interest and properly checks in, the Vcheck platform merely logs the check-in and does not generate a particular alert to the agent. In the event that the Vcheck platform determines that the continuous tracking data indicates that the client is in violation of a zone (for example, entering an exclusion zone), it sends an alert message to the agent along with the GPS tracking data from the client's Vcheck app gathered according to the continuous tracking protocol. The alert message is received by the agent. The agent may choose for the Vcheck platform to log the infraction alert, and may contact the client (such as making a call or sending an email or text).

Figure 33:
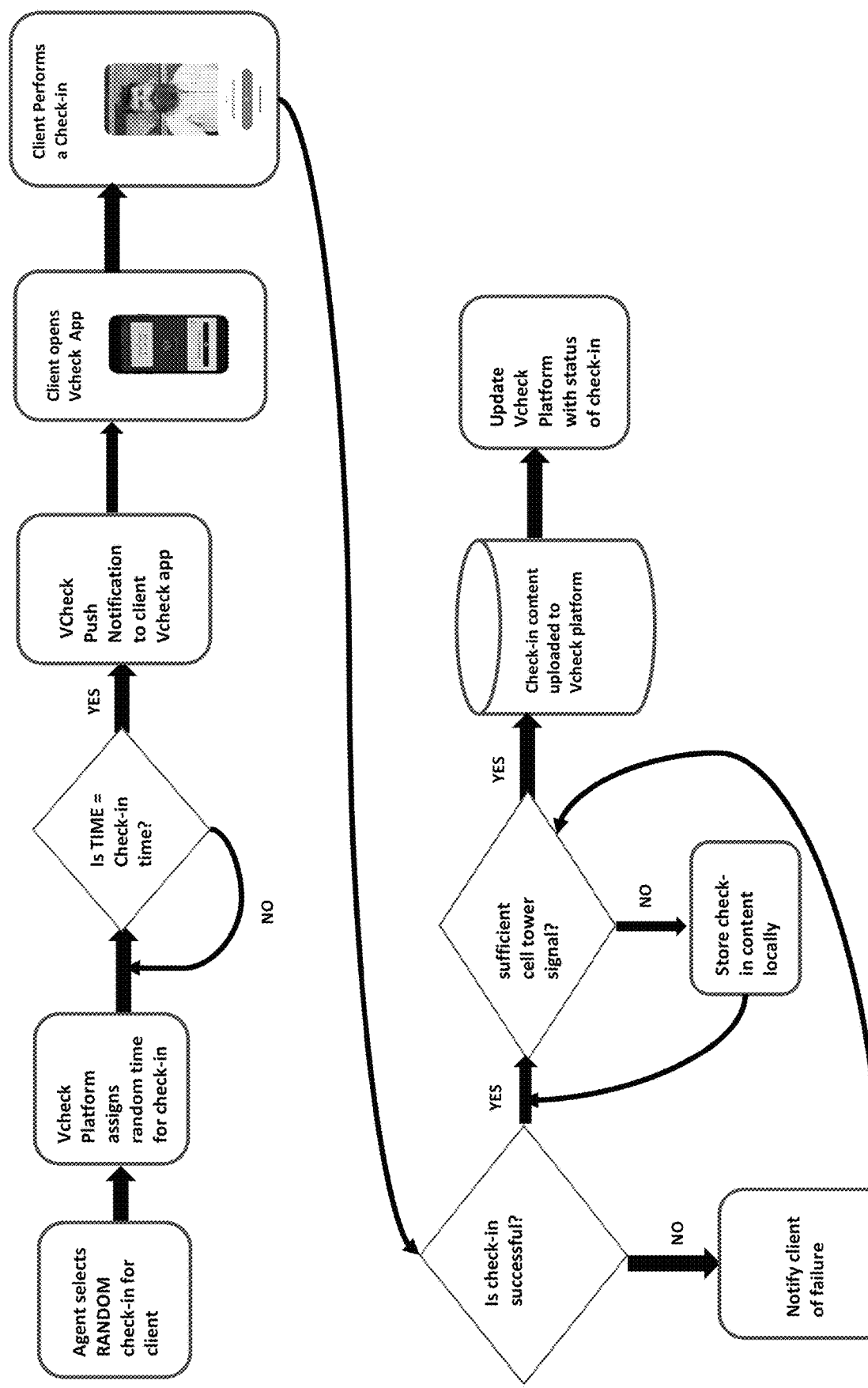

The agent is further able to create individualized plans for check-ins for clients. That is, the agent can determine the types of events that trigger a need for a video check-in. For example, a client that has a good track record of showing up to work may not need a video check-in every day for work, but the agent may set a need for video check-ins for other zones of interest, such as court or a doctor's office. The agent may require another client to video check-in upon arriving at a work zone of interest, check-in again at lunch time whether or not the client left the work zone of interest, and check-in again at a random time. One example of the system's performance of a random check-in is shown in the flowchart of FIG. 33. The agent may utilize the Vcheck platform to set the forgoing criteria, which are then linked to the client and the client's Vcheck app by the Vcheck platform. The agent may alternately or additionally require a client to check-in upon entering and exiting a zone of interest. The Vcheck platform may log the geofence transitions. The client may then conduct the video check-in. The data from each event is transmitted and stored by the Vcheck platform, and the agent is able to view the check-ins on the Vcheck platform by downloading or streaming them to the agent's device. On example of the system's performance of a zone-triggered check-in is set forth in the flowchart of FIG. 34.

For example, for a given day or week, the agent may view a display of the logged check-in events for a client using the Vcheck platform. The display may show the client's GPS position over time, and show instances where the client checked in at new zones. The system may also highlight infractions where the client failed to check-in or where the client was in a zone of interest or in an exclusion zone. The Vcheck platform may further highlight video check-ins that the agent may access for confirmation that the client appropriately conducted the video check-in. Thus, the agent is able to confirm whether the client has correctly checked in as required.

The Vcheck app and Vcheck platform may also be configured to perform live video check-ins. In one embodiment, when the client selects the check-in option on the Vcheck app, the Vcheck app may determine whether to perform a recorded video check-in (i.e. one that is simply uploaded or streamed and saved directly to the Vcheck platform) or connect to an agent to perform a live video check-in. In the case of a live-video check-in, the client accesses the Vcheck app which provides access to the recording and communication tools that the client may use to complete a check-in. In one embodiment, the client may activate the check-in by clicking a check-in button, and Vcheck app then activates the client device's forward facing video camera and provides instructions for the client to video themselves for the check-in. The video may be two-way, so that the client and agent can see each other. In one embodiment, the system streams one-way video that is stored on the Vcheck platform while the agent is able to view the video and, in one embodiment, provide audile or messaging feedback.

In a further embodiment, when a client engages in the video check-in, the system simultaneously records (or streams to the Vcheck platform) video from both the forward facing camera and the backward facing camera. That way, the agent is able to confirm the client's identity and view the surrounding area simultaneously.

In another embodiment, the client activates the video check-in function and the Vcheck app begins to video record using the front camera, back camera, or both. The client performs a check-in, such as by answering questions or reciting randomly generated prompted information. The client's device records the client's interaction and later uploads it to the Vcheck platform which synchronizes the check-in with the agent's Vcheck dashboard.

In one embodiment, when an agent seeks to accesses the Vcheck platform to view a check-in (such as by opening the agent's Vcheck dashboard viewable by an agent on the agent's computer), the agent can select a client, which then populates the dashboard with that client's account. The agent may select a date of interest, and the Vcheck platform may populate the date with all of the client's check-ins. The agent may then select a check-in and the Vcheck platform can display the relevant data for that check-in, such as a map of the client's location, the time, and audio/video of the check-in. In one embodiment, the agent may highlight a particular day of the week where the client checked in multiple times. Accessing the day populates the officer's screen with maps showing the client's locations during each check-in. Hovering a cursor over the maps brings up options to access data pertaining to the check-in, for example a link to the recording of the check-in may pop up or the time/duration over which the check-in occurred may pop up.

One embodiment of the present system allows the agent to dynamically modify the client's check-in schedule. Using the Vcheck platform, the agent may enter a particular schedule for a client's check-ins. The schedule may include particular time ranges, specific times, particular locations, or a geofenced zone of interest. The agent may set the schedule in advance, for example, a weekly schedule. The client may review the schedule, for example as by reviewing an electronic calendar associated with the client's account. The client may then request modifications to the schedule at any time prior to the check-in time. Using the Vcheck app, the client may electronically adjust one or more of the parameters, such as moving a check-in time from 2:00 pm to 3:00 pm, or moving a check-in location from the client's home to work or a family member's home. Adjusting the parameter results in the creation of a "notes" log, where the client can input a brief note or message explaining why the adjustment is requested. The information is saved to the Vcheck platform which updates the agent's dashboard automatically to reflect the requested change and allows the agent to review the notes. The agent may then approve the request (and the Vcheck platform automatically updates the client's and the agent's check-in calendars), deny the request (and the Vcheck platform sends a message to the client notifying the client of the denial and no adjustment is made), or the agent can request additional information. In one embodiment, the adjustment request appears on the agent's dashboard as a pop-up overlaying a calendar corresponding to the client's scheduled check-ins. That allows the agent to view the request in relation to other check-in events and it allows for the automatic update of the calendar (both client side and agent side) upon approval, rather than having to open email, check the calendar, email a response, and manually update the calendar. While the present system has been described in the context of a check-in between a client and agent, it should be understood that a client and agent could be any persons, such as a criminal and an officer, patient and doctor (for example monitoring taking medication), a student and teacher (for example confirming the student is in the appointed class), employee and employer (for example ensuring that the employee is at the correct location), a child and parent, a player and coach, etc.

For some clients, there is a need to monitor or prevent interactions with others. For example as a condition of parole, a client may be required to avoid contact with other criminals. For example, a gang member may be prohibited from contacting other convicted gang members. In such cases, both the client and the other individuals are logged into the Vcheck platform. Essentially, all the individuals are clients within the Vcheck platform, and for ease of reference the persons will be referred to herein as the prime client and secondary clients.

The Vcheck system collects location data from the prime client and secondary clients continually as discussed above. The location data is transmitted to the Vcheck platform which then process each client's locations and cross-references the locations with the identities of secondary clients that the prime client is prohibited from interacting with. When a the prime client remains in the vicinity of a prohibited secondary client for a particular time threshold (such as within 100 meters), which may be as little as a single overlapping instance, the Vcheck platform may log the incident or alert the client or the agent of the infraction.

Additionally, Vcheck platform may be utilized by law enforcement, and law enforcement may upload crime incident reports to the Vcheck platform. For example, the Vcheck platform may be provided with a feed from local municipalities or crime reporting databases on a daily basis. An agent may also input crime data manually. In another embodiment, Vcheck may monitor the internet for crime related news updates and collect the news reports (similar to the monitoring of news by Google® Alerts using a set of keywords-exemplary keywords used for monitoring may be 'crime,' 'shooting,' 'robbery,' 'theft,' 'murder,' 'homicide,' etc.), scrape data, such as location and names, from the news reports, and use the scraped data to populate the Vcheck platform database with incidents. It should be understood that crime is just one category of event, and the system may be configured to cull data respecting any type of incident or event that occurred by modifying the keywords. The Vcheck platform may automatically cross-reference the locations of clients with the locations of secondary client or the locations of incidents (such as a crime). Where the cross references match, the Vcheck platform automatically sends the agent a notification of the overlap so that the agent may follow-up. Alternatively, the agent can enter a date, time, and radius of location on a map (e.g. May 1, 2020, 11:05 pm, map location X, radius 1000 ft) and the Vcheck platform will return all clients within that location and which meet the set parameters.

Because the system gathers client location data on an approximately continuous basis, the agent can populate a map with the locations of multiple clients in near real-time. For example, from the agent's dashboard, the agent selects a number of individual clients (three for example). After selection, the system populates a map with the individuals. For example, each individual may be represented by a different color arrow that updates in near real-time (based on the interval of data collected) with the direction of the individual's last movement (which may be determined by comparing the present location to the previous known location). The individuals are each overlaid on the same map, allowing the agent to view them in relation to one another in real-time. Hovering over or selecting an arrow can cause a pop-up to appear with information about the individual, such as a picture.

The agent is further able to designate alert zones as particular zones of interest that will automatically trigger an alert to the agent. The alert in that instance may be in addition to the generally continuous tracking notifications. The agent may identify particular alert zone, such as an airport or local police station. In the event that the client enters an alert zone, the client's Vcheck app sends an alert to the agent, and the alert is populated on the agent's dashboard, and may further be pushed to the agent's email or text message. Thus, even if the client was not obligated to check-in at the time, and even if the alert zone is not an exclusion zone, the agent will still receive the special alert. In this way the agent can be notified of risky, though not strictly prohibited activity, such as a potential for the client to be flying when they are not allowed to (but perhaps simply picking up an acquaintance at the airport) or potentially having been arrested.

In one embodiment, a victim may be concerned about a client violating a restraining order. The Vcheck platform may identify a zones of interest around areas that the victim frequents, such as home or work. The victim may set up a Vcheck app account to receive alerts from the Vcheck agent. In the event that the client enters a zone of interest associated with a victim, the Vcheck platform sends an alert to the agent or the victim notifying them of the incident. By utilizing the Vcheck platform to perform the cross-referencing analysis, the system is able to ensure that no account information relating to the victim is stored in any capacity on the client's device or in the client's account. A subsequent alert may be sent when the Vcheck platform performs another location check that indicates that the client is no longer in the zone of interest. That way a victim may be in higher alert if the client is within the zone of interest of the victim, can modify their behavior, or contact authorities, but the client is not alerted to their proximity to the victim.

The Vcheck system may be used in other applications than law enforcement. For example, clients may voluntarily sign up with the system and create client accounts. People may input information about themselves and input information regarding other's that they do or do not want to be associated with. The Vcheck platform collects the client accounts and performs comparisons between the accounts. Each client's Vcheck app sends location data back to the Vcheck platform and the Vcheck platform cross-references the locations of the clients with the clients' preferences. When the Vcheck platform determines that one client is in the proximity of another and one or the other client has an exclusion indicating that they do not want to be in proximity to the other, that client receives an alert from the Vcheck platform with an indication that the another client (without revealing personally identifying information) is located in proximity to the client. The client may then be on higher alert or may leave the area. The other client (who caused the proximity alert by their presence) need not be informed that their presence resulted in the client receiving an alert. In that way, individual clients may avoid interactions that they would prefer to avoid without the other person being notified.

Because the Vcheck platform is continually collecting client location data, the Vcheck platform is able to dynamically map client movement. For example, the agent may select a client and a time frame (which may include a start and end time, or simply a start time, which may be the time that the agent selects "start," and be open ended to proceed in real-time). Over the period of time selected, the Vcheck platform populates a map (such as a Google map) with the locations of the client. The locations may be connected by lines to show the path of the client. Because the locations are associated with times, the Vcheck platform is able to extrapolate the vector movement (i.e. speed and direction of movement) of the client during the selected time. The Vcheck system may then weight or color the path lines to provide the agent with a visual representation of the vector movement of the client. In one embodiment, the default setting is 24 hours, such that by selecting a movement map for a particular day, the Vcheck platform graphically depicts a client's vector movement over the course of that entire day.

In one embodiment the Vcheck platform extracts from the vector movement periods where the client remained in a particular location for an extended period of time. For example, a series of location data points are collected from the client indicating that the client is moving along a path, for example a path from a home address toward a second address. Upon reaching the second address, the clients' location data points remain in approximately the same location for repeated checks. For example, the Vcheck platform logs location checks for 30 minutes that are all within the same 100 meter radius of the second address. The Vcheck system then logs additional location checks indicating the client is moving toward a third address. At the third address the client remains substantially stationary for one hour. The process then continues. The agent may select location filtration though the Vcheck platform. The Vcheck platform then removes vector movement, and plots on a map those locations where the Vcheck app indicated that the client remained substantially stationary. The map may display the date and time, and the approximate amount of time that the client remained at the particular locations.

One of the functions of the Vcheck platform is to allow for ease of communication between the client and agent. The Vcheck platform stores the clients contact information (such as phone number and email) in association with the client's account. The Vcheck platform also stores the agent's contact information in association with the agent's account. The Vcheck platform may then link one or more clients to an agent, however neither the clients' nor the agent's contact information needs to be shared with the other parties. Rather, communications are funneled through the Vcheck platform such that the Vcheck platform determines where to send a message. For example, the client may open the Vcheck app and select an option to send the agent a message. When the client executes a "send" command, the Vcheck app transmits the message to the Vcheck platform where a copy of the message is stored. The agent may then view the message on the Vcheck platform. Additionally, the Vcheck platform correlates the sending client with that client's agent and transmits the message to the agent using the agent's contact information. Thus, if an agent's account has an email, the Vcheck platform recognizes the email and forwards the message to the agent. The agent may respond by replying to the email. The reply is sent to the Vcheck platform where a copy is stored in association with the client account. The client may then view the message through the Vcheck app. The Vcheck platform may also forward the message to the client using the client's contact information. Rather than email, the system could use text messages in the same manner. Thus, messages transmitted through the Vcheck platform may be scrubbed of contact information (i.e. email address or phone number), saved on the Vcheck platform independent from the agent's device or client's device, viewable in a single conversation on the Vcheck platform regardless of the type of message transmitted (i.e. email or text), and simultaneously transmitted to the client or agent in their preferred method of receiving messages (text, email, etc.) that they select as part of their profile. This also ensures that copies of the messages are saved and transmitted to a client even if the client's phone is off or the Vcheck app is shut down.

It is contemplated that the present system may be used for monitoring persons on parole. In such situations, communications between the client and agent may be used as evidence in a court hearing. Thus the credibility of the communications is important. In one embodiment, the present system does not permit the client to provide a response to a message from an agent without utilizing a predetermined acknowledgement. For example, before responding, the client is provided with options of 1) received, read, and understood; 2) received, read, did not understand; 3) received, not read. In connection with any of the foregoing, the client may also provide a comment. The message is then transmitted back to the agent. This confirms the client's mental awareness of events at the time that they occur, and thereby maintains a trustworthy record, preventing a client from later claiming they did not receive or did not read or did not understand a particular message. The agent is able to send the message through the Vcheck platform (using the agent's dashboard) which communicates the message to the Vcheck app on the user's mobile device. In that way, the agent is able to securely send messages without directly using a personal phone or email, and the message string can be saved on the Vcheck platform thereby maintaining a record of the message even if the client's device is compromised. In embodiments that store the string on the Vcheck platform, for example, there is no risk that the client intentionally or accidentally deletes the messages, and the messages are saved even if the client's device is destroyed.

In conjunction with ensuring accurate check-ins or in response to agent messages, the present system may require biometric identification information. The Vcheck platform may store biometrics associated with client accounts. For example, a client's account may have associated with it the client's finger or thumb print, voice authentication data, iris or retina scan data, facial feature data for facial recognition, or other unique biometric data of the client. Prior to or in conjunction with a check-in or message to the agent, the Vcheck app prompts the client to enter biometric data. For example, the client is prompted to enter a thumb print. The biometric data and message (or check-in) may be transmitted to the Vcheck platform. The Vcheck platform cross references the biometric data with the biometric data associated with the client account. Based on the comparison, the message may be labeled as approved/authentic (or some similar positive assessment) questionable (if the match is not entirely sufficient) or unapproved/fraudulent (or similar negative assessment) if the cross-check reveals there is no match. The Vcheck platform can provide the assessment to the agent who can then review the records and, if necessary contact the client.

In one embodiment the Vcheck app utilizes the client's near field communication system to connect with a paired near field devices. For example, the Vcheck app may pair with a Bluetooth wearable device. As a condition of parole, for example, a client may be required to maintain a transdermal sensor that monitors blood alcohol content. The Vcheck app may connect to the transdermal sensor to extract BAC and transmit the BAC to the Vcheck platform. For example, during a check-in, the Vcheck app may communicate with the near field device, log data, and transmit the data in conjunction with the check-in. This may be done during the video check-in which enables the agent to confirm that the near field device is appropriately linked with the client, rather than linked to an alternative person that happens to be close to the client.

Figure 2:
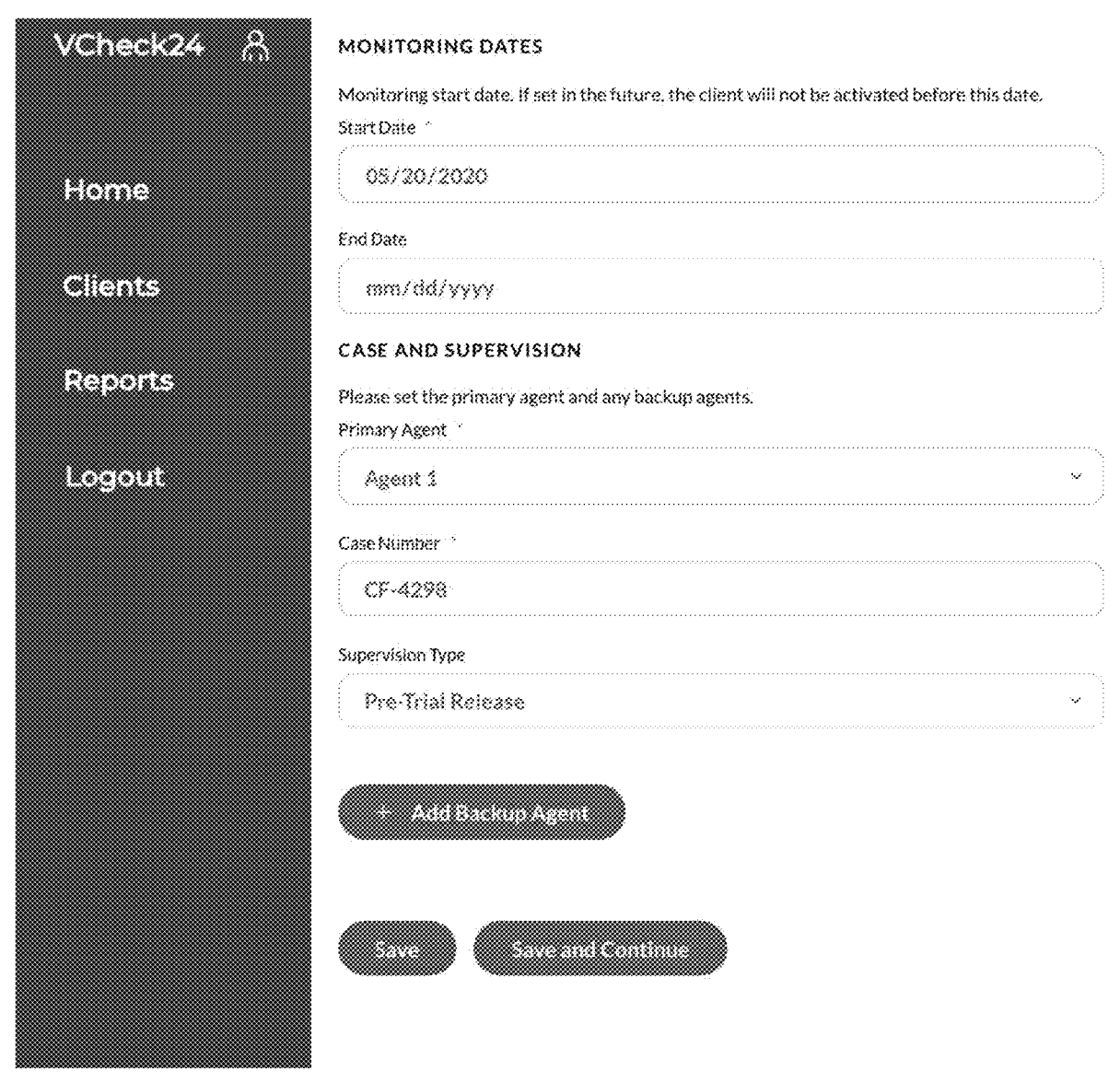

The Figures comprise exemplary user interfaces used with the present system. FIGS. 1-2 are examples of the Vcheck platform accessible by agents through the agent dashboard that enable the agent to add a client or view the information of a particular client. It includes buttons 101, 102, 103, 104 for accessing different functions of the Vcheck platform. It includes buttons such as Client 105 for bringing up a client's general information (shown in FIGS. 1-2), such as name, DOB, contact info, monitoring dates, case number, etc. Different pages of client information may be accessed by clicking on the Client tab 106 (the client tab page being shown in FIGS. 1 and 2), Zone tab 107, Schedule tab 108, Verify tab 109.

Figure 3:
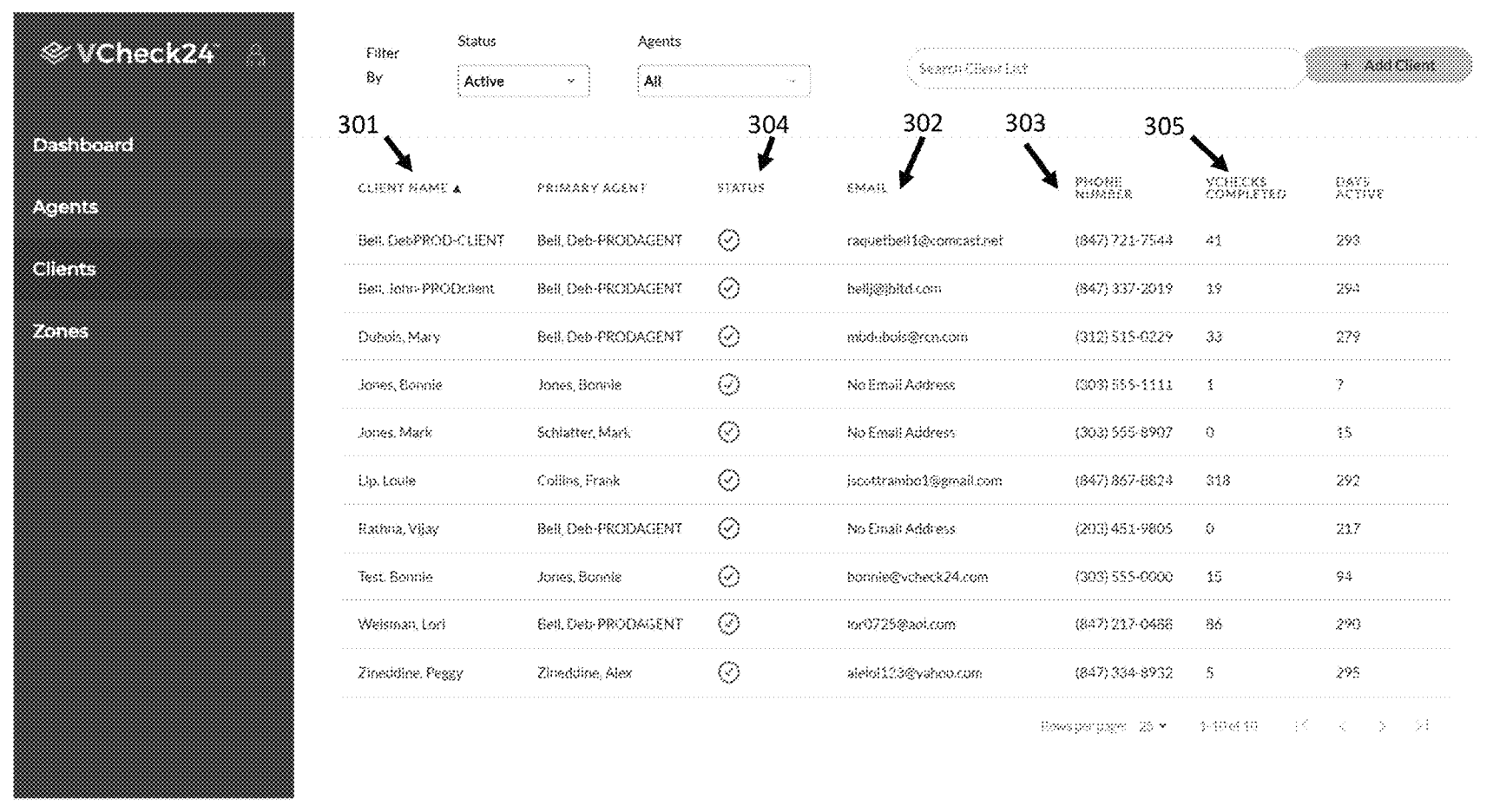

Clicking on the Clients button 102 brings up a clients page, FIG. 3. The Clients page lists the client assigned to an agent. The list of clients are organized in a chart and may include the client's name 301, contact information 302, 303 and status 304 (such as a check showing active status or an X showing terminated/inactive status), as well as an indication of whether the client completed a check-in 305.

Figure 4:
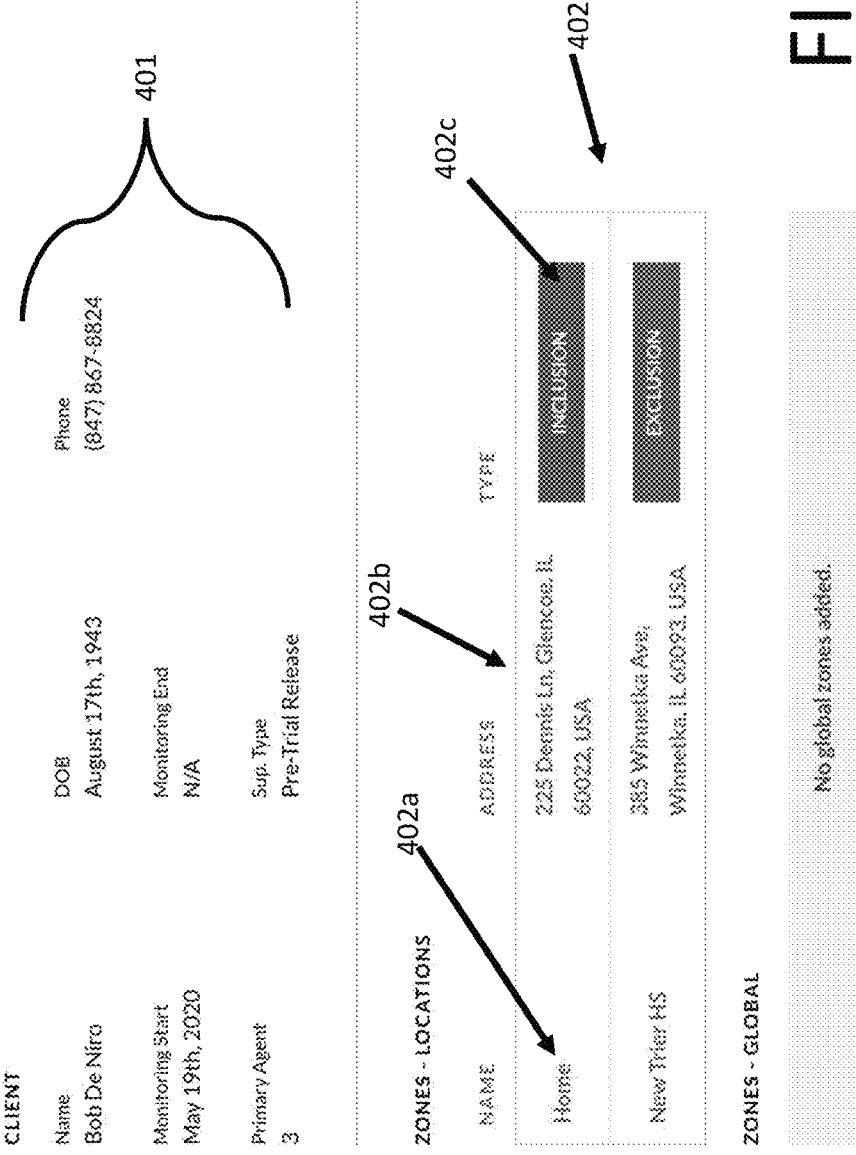
FIG. 4 is an image of an embodiment of the Vcheck platform display of an agent's Zones page.
Figure 5:
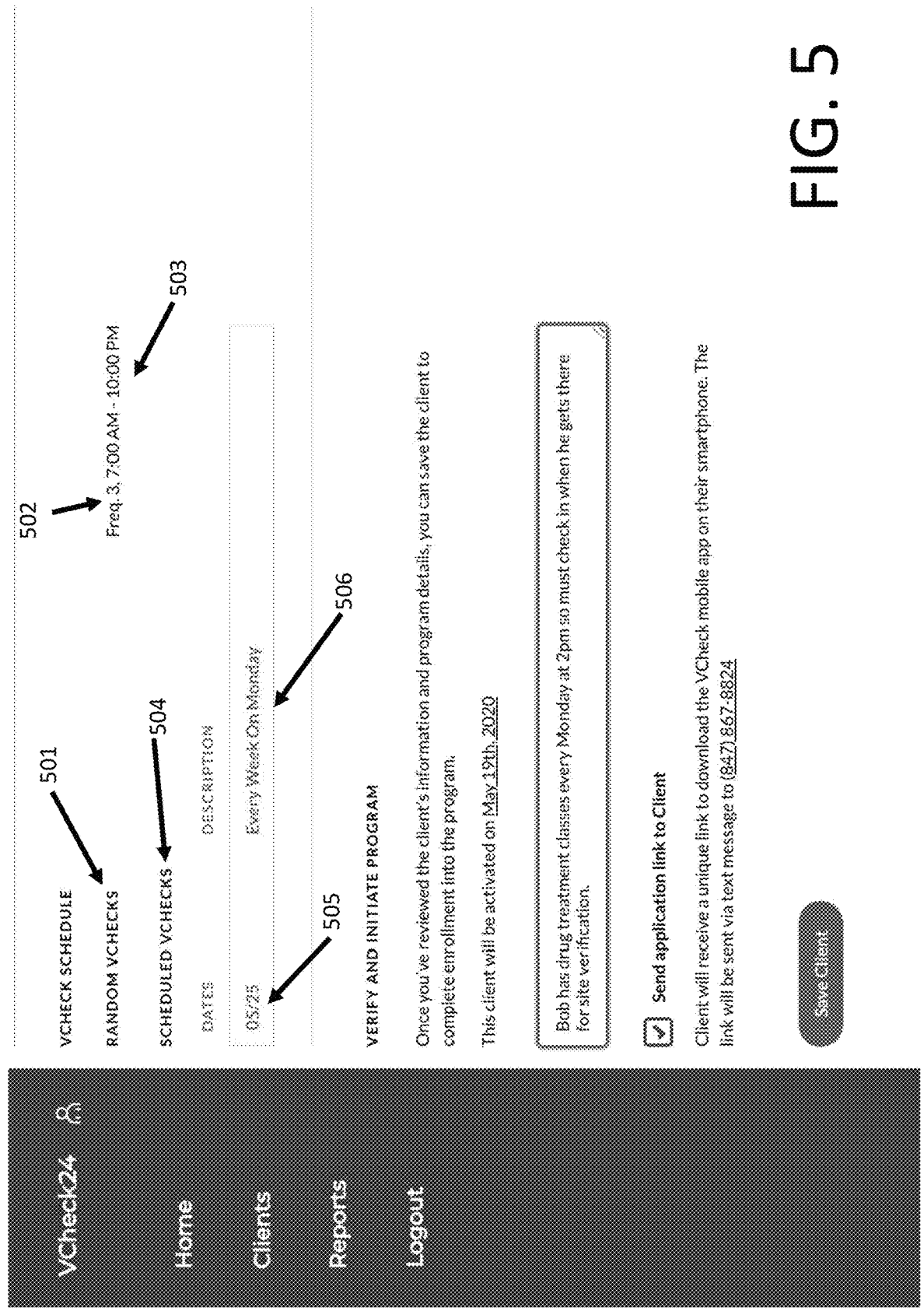
FIG. 5 is an image of an embodiment of the Vcheck platform display of an agent's Zones page for inputting a schedule of check-ins

FIGS. 4 and 5 depict an embodiment of the agent's Zones page. The zones page includes an indication of personal information 401 relating to the client. It includes zones that the agent has added that correspond to zones of interest for the client. For example, the agent may add an inclusion zone 402, including a name for the zone 402a, an address of the zone 402b, and the type of zone, 402c. The page includes a schedule for client check-ins. For example, as shown in FIG. 5, the agent assigned the client Random checking 501, at a frequency 502 of 3 times per time block, and the time block 503 is set for 7:00 am-10 pm. Additionally, the client is assigned scheduled check-ins 504, which have a start date 505 (May 25) and continue according to a set schedule 506 (every week on Monday). To assign the client parameters to a client, the agent saves the client information to the system and the Vcheck platform sends the client a link to download the Vcheck app to their device.

Figure 6:
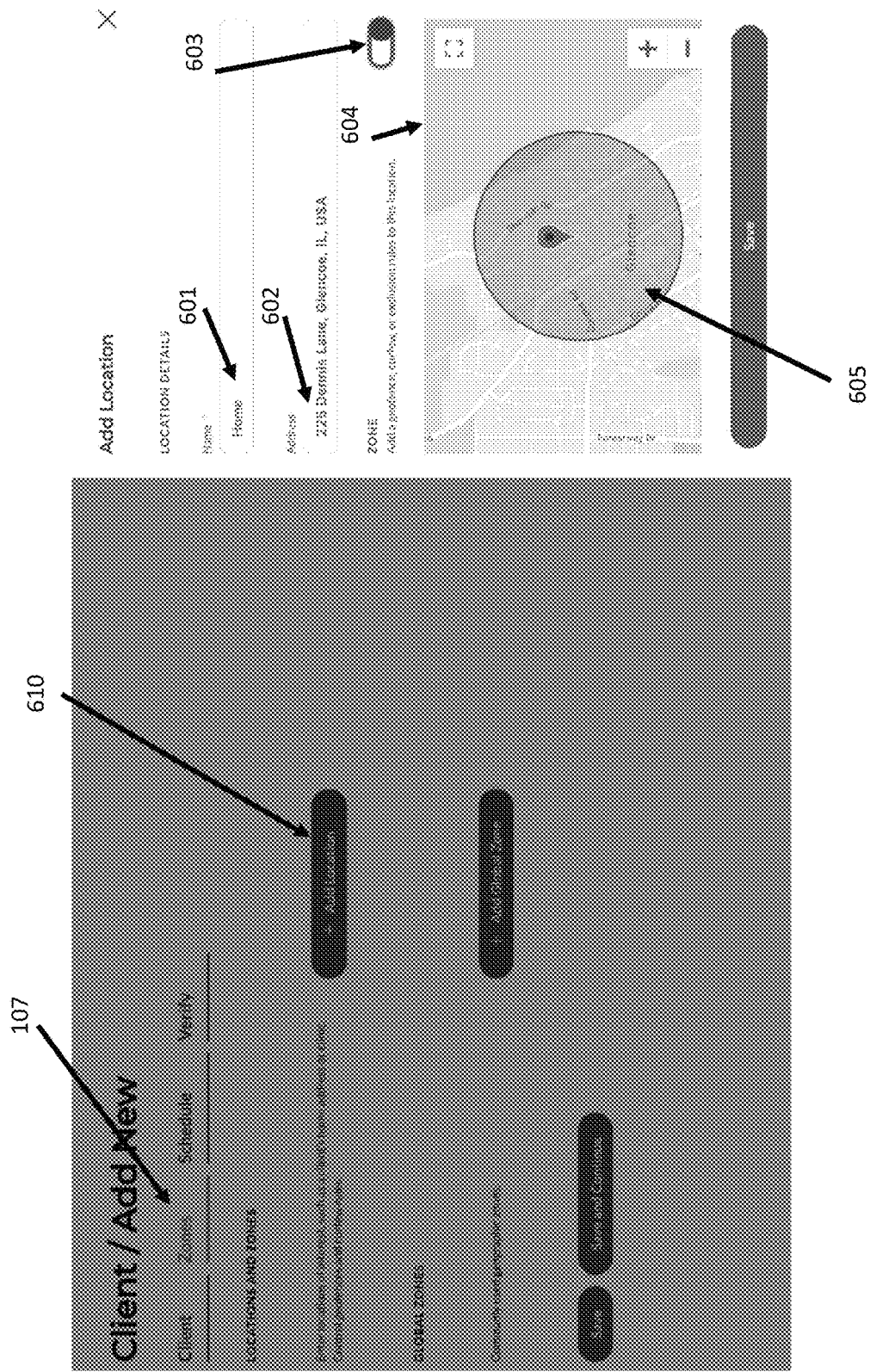
FIG. 6 is an image of an embodiment of the Vcheck platform display of the Vcheck platform's system for adding an additional zone.
Figure 7:
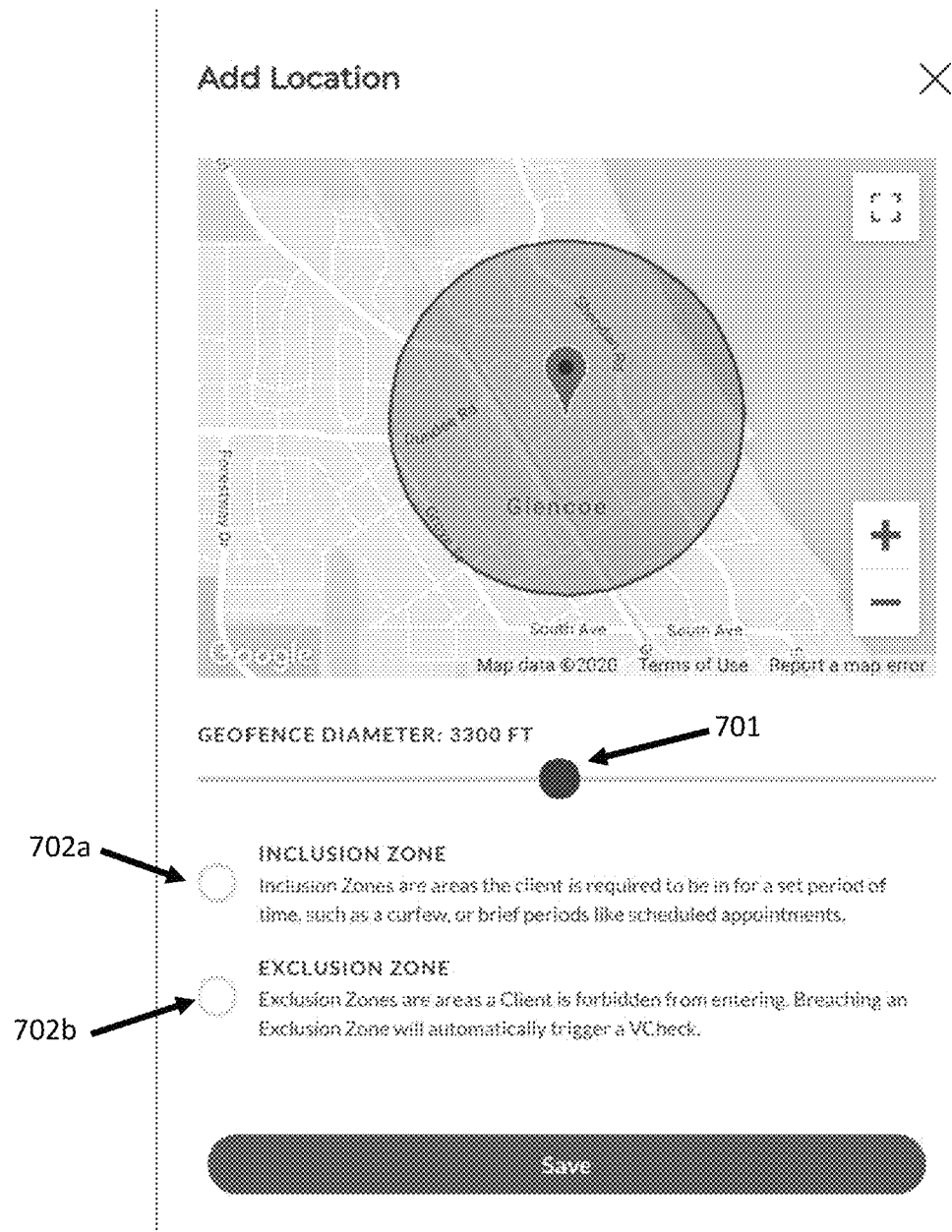
FIG. 7 is an image of an embodiment of the Vcheck platform display of the Vcheck platform's system for adding an additional zone.

FIG. 6 is a depiction of the Vcheck platform's system for adding an additional zone. From the Zone tab 107, the agent may select Add Location 610. The button brings up a window that allows the agent to populate the zone. The window includes a name field 601, and address field 602, a map 604, a zone of interest 605 that can be increased or decreased in size by the agent, and an option to add further restrictions 603. As shown in FIG. 7, activating the option to add further restrictions allows for the manipulation of the size of the zone 701, and options to designate the type of zone of interest 702a, 702b. In one embodiment, a library of predefined zones is available to the agent and the agent may select a zone to automatically populate the fields and then optionally adjust the parameters of the zone to suit the individual client needs.

Figure 8:
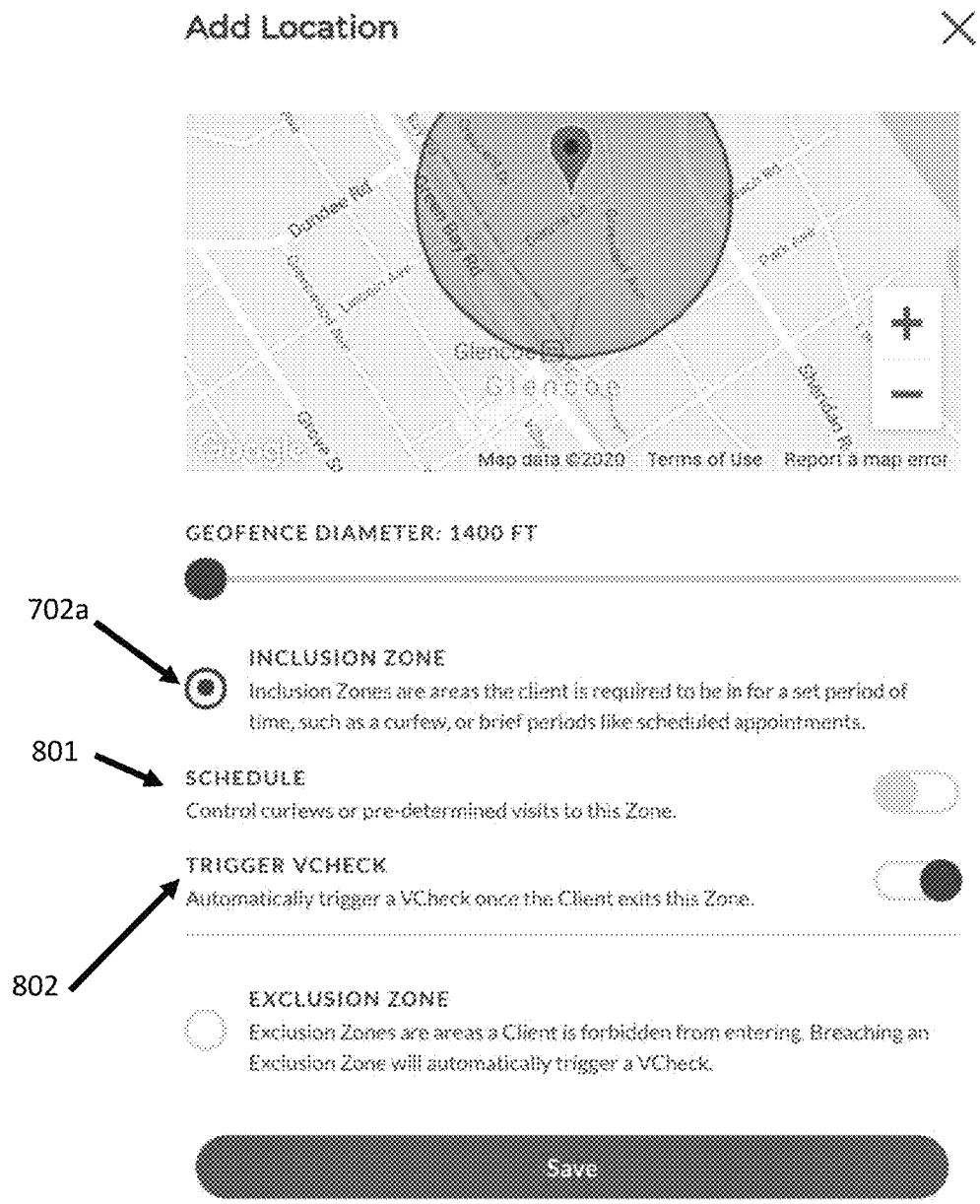
FIG. 8 is an image of an embodiment of the Vcheck platform display of the Vcheck platform's system for adding an additional zone.
Figure 8A:
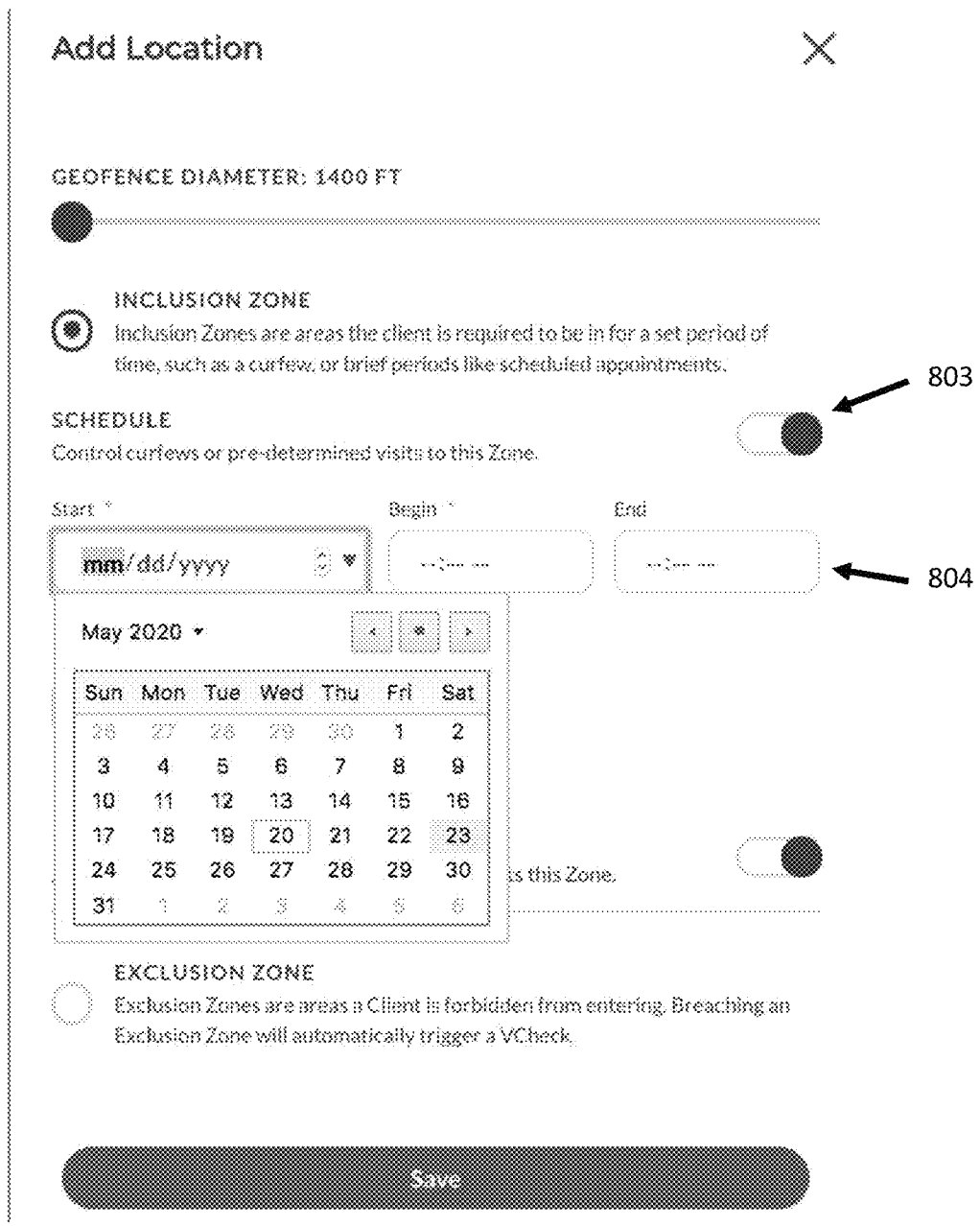
FIG. 8A is an image of an embodiment of the Vcheck platform display of the Vcheck platform's system for adding an additional zone.
Figure 8B:
FIG. 8B is an image of an embodiment of the Vcheck platform display of the Vcheck platform's system for adding an additional zone.

As shown in FIG. 8, selecting Inclusion Zone 702a provides options to schedule parameters for the zone 801, and set the zone to automatically trigger a check-in 802. In FIG. 8A, the schedule button 803 is selected bringing up date fields 804 to allow the agent to set a schedule of date and times for the zone to be active. As shown in FIG. 8, the agent may select the frequency of the activity of the inclusion zone 805, such as daily, and an end date 806.

Figure 9:
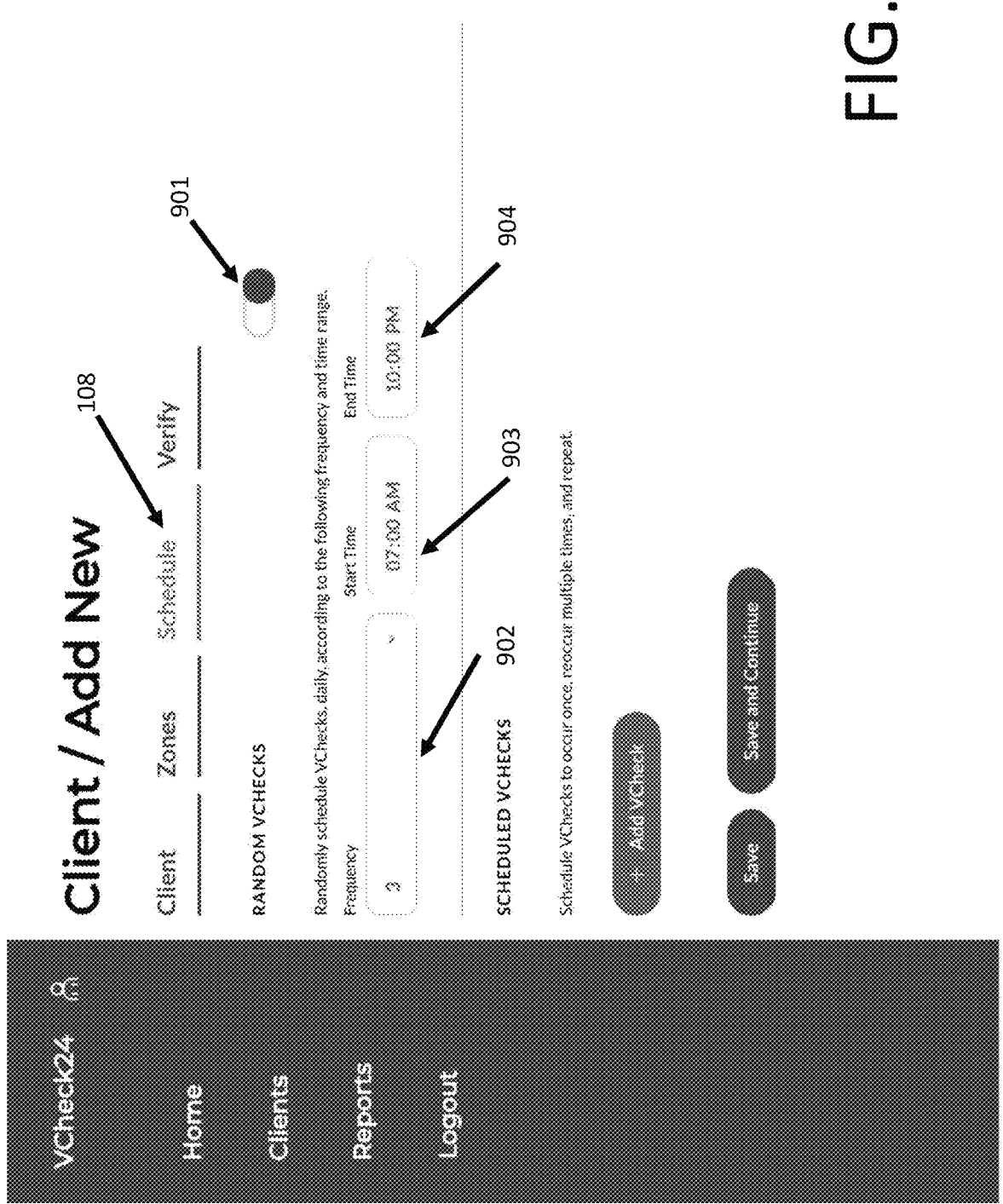
FIG. 9 is an image of an embodiment of the Vcheck platform display of the Vcheck platform's system for adding or modifying a check-in schedule.
Figure 9A:
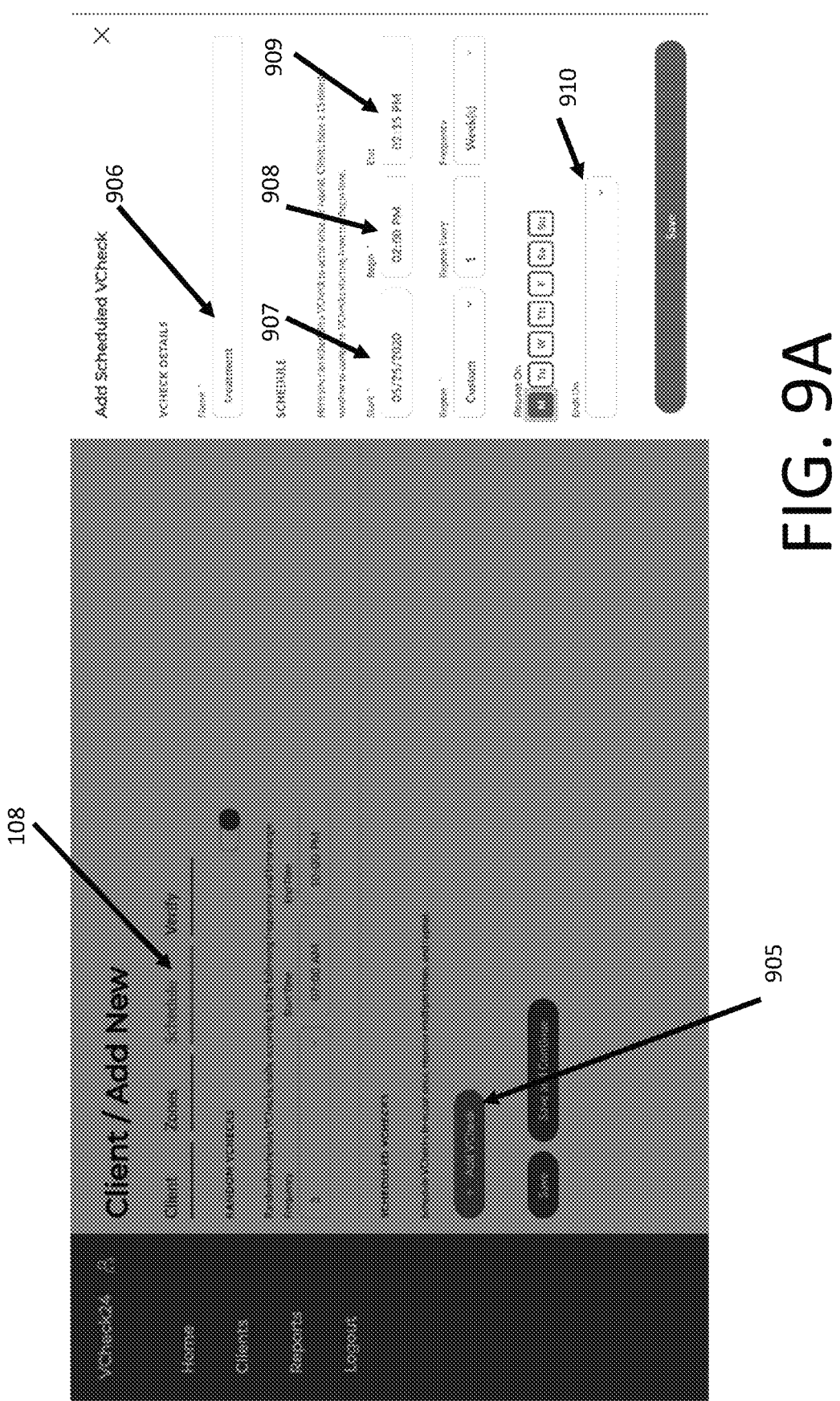
FIG. 9A is an image of an embodiment of the Vcheck platform display of the Vcheck platform's system for adding or modifying a check-in schedule.

Under the Schedule tab 108, the agent can select the Ransom check-in selection 901 which allows the agent to set parameters for random check-ins. The selection provides fields for setting the frequency, 902, the range when the checks can happen by setting a start time 903 and end time 904. The Agent can also add a scheduled check in by selecting the add button 905 (FIG. 9A) which brings up a window for inputting scheduling data. The agent may input a name 906, a start date 907, and end date 910, time schedule 908, 909, and frequency schedule.

Figure 10:
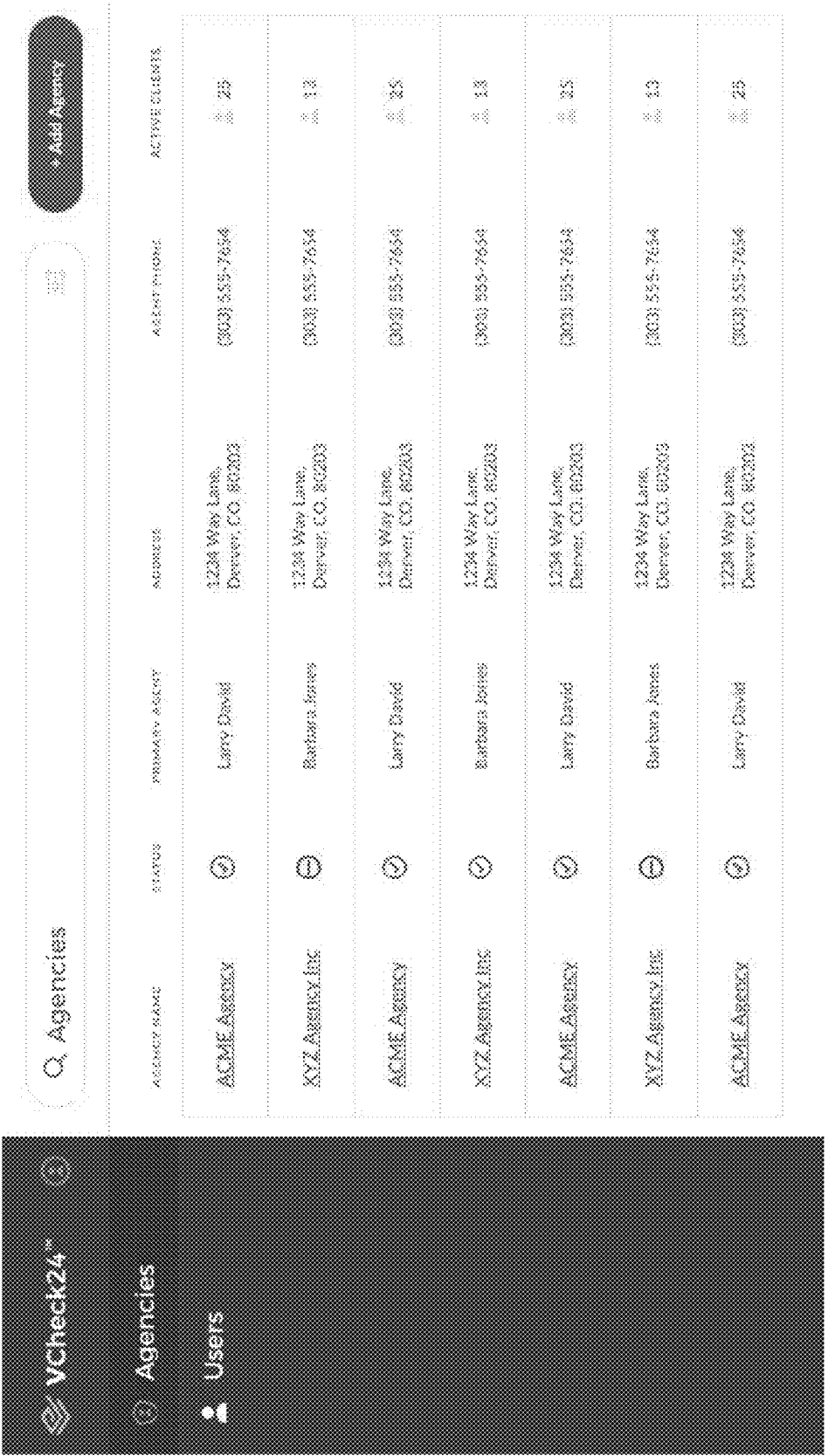
FIG. 10 is an image of an embodiment of the Vcheck platform display of the Vcheck platform's display of a list of agents with contact information and an indication of the number of clients each is responsible for monitoring.
Figure 11:
FIG. 11 is an image of an embodiment of the Vcheck platform display of the Vcheck platform's Clients page allowing an agent to view a list of clients

The Vcheck platform may support multiple agents who in turn support multiple clients. Client accounts are separated from each other such that individual clients are only permitted to view their own account. Agent accounts permit agents to view their own account, and optionally accounts of other related agents (such as agents all working for the same company may each access other agent accounts within that company), but not the accounts of unrelated agent (e.g. agents of an alternative/competitor company). The Vcheck platform may also include one or more administrator accounts that provide the administrator with access to all of the agent and client accounts. An administrator may add agents to the platform, by entering (or allowing to be entered) account information for the agents. FIG. 10 is an example of a list of agents with contact information and an indication of the number of clients each is responsible for monitoring. By clicking on the Agents button 1103, an administer that is logged into the Vcheck platform can view a list of agents 1101, 1102, for example, as shown in FIG. 11.

Figure 12:
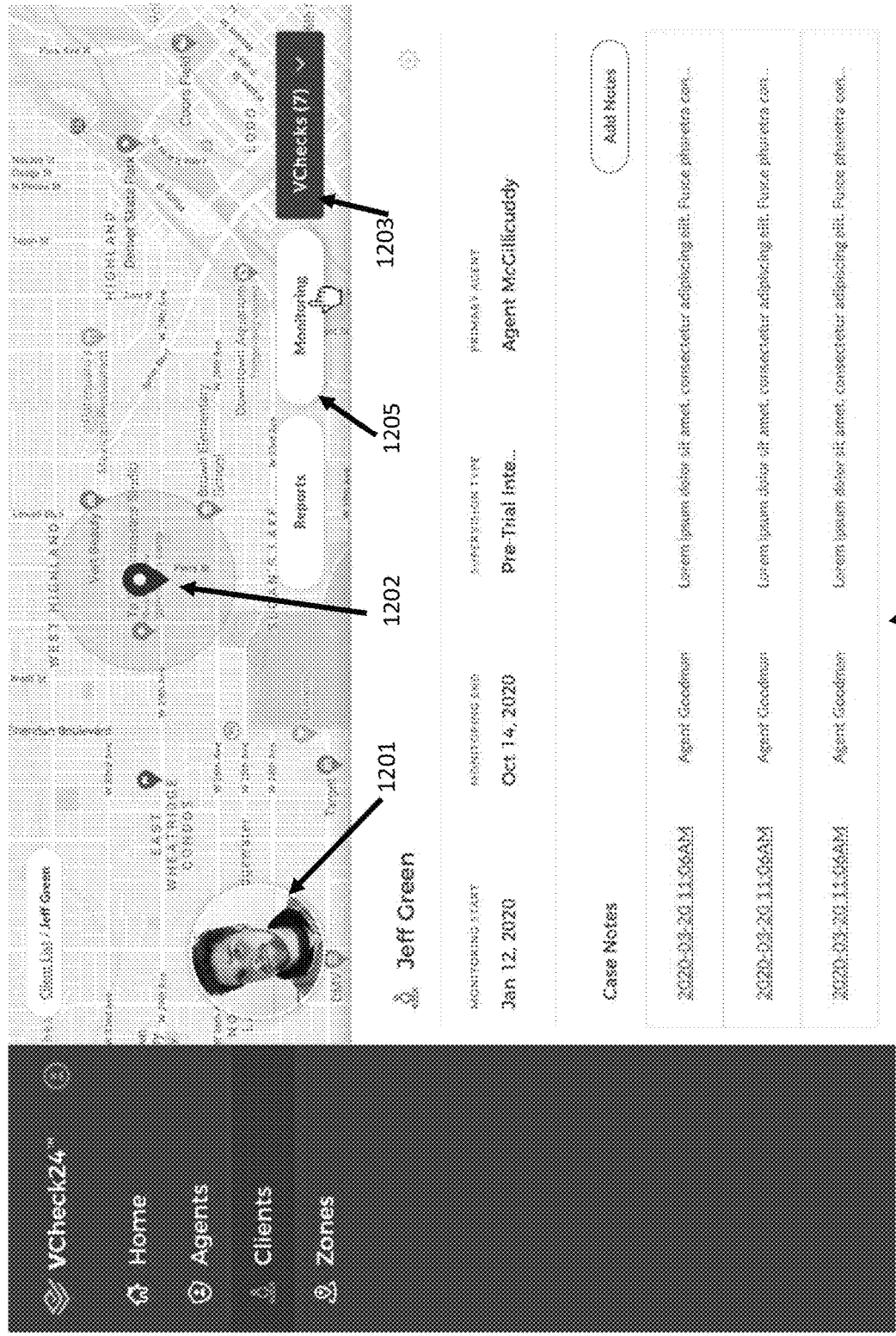
FIG. 12 is an image of an embodiment of the Vcheck platform display of the Vcheck platform's client account information page.
Figure 13:
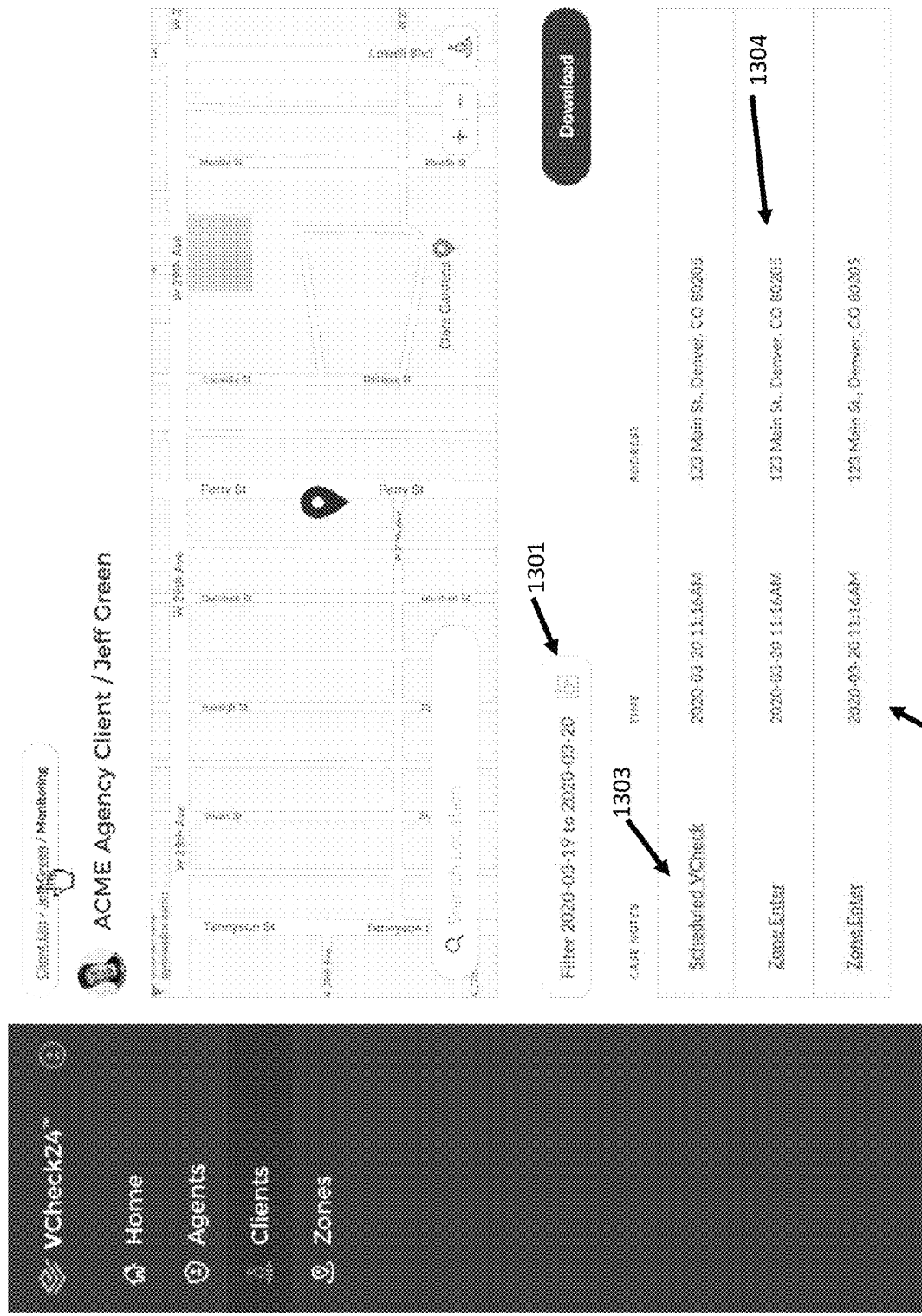
FIG. 13 is an image of an embodiment of the Vcheck platform display of the Vcheck platform's client monitoring page

Agents may also access individual clients through the clients page. Selecting a client brings up a client information page as shown in FIG. 12. The client information page may include a picture of the client 1201 and a map with the client's current location 1202. The agent is also provided with access to the client's check-ins 1203, which include links to the video check-ins discussed above, and a notes section 1204. By selecting the monitoring button 1205, the agent is directed to a page providing more detailed information regarding the client's movements as shown on FIG. 13.

The agent is able to gain a more precise location for the client by zooming in on the map. The client can adjust the time frame of interest by adjusting the calendar 1301. The monitoring page provides a list of monitored activity 1302 for the date range selected. For example, the list includes the client's check-in 1303, and displays when the client entered a particular zone 1304. In one embodiment, the client activity may include a list of each location data reading, for example listing the client's location at three minute intervals corresponding to the frequency of location transmissions from the client device. The list functions as a spreadsheet allowing the agent to sort by the type of activity (for example, to filter or group check-ins or zone transitions together). In one embodiment, when successive location data transmission indicate a lack of movement, for example, they indicate that the client has remained within a zone of interest, the Vcheck platform may consolidate the successive in-zone data entries into a single entry in the table. Such an entry may be provided with an indication that it is a consolidated entry (such as by highlighting or the addition of a carrot). The agent may select the entry, or click the carrot, to expand the entry.

Figure 14:
FIG. 14 is an image of an embodiment of the Vcheck platform display of the Vcheck platform's administrator view of agencies that utilize agents that monitor clients using the Vcheck platform and app.
Figure 15:
FIG. 15 is an image of an embodiment of the Vcheck platform display of the Vcheck platform's system for entering or modifying an agency's information.
Figure 16:
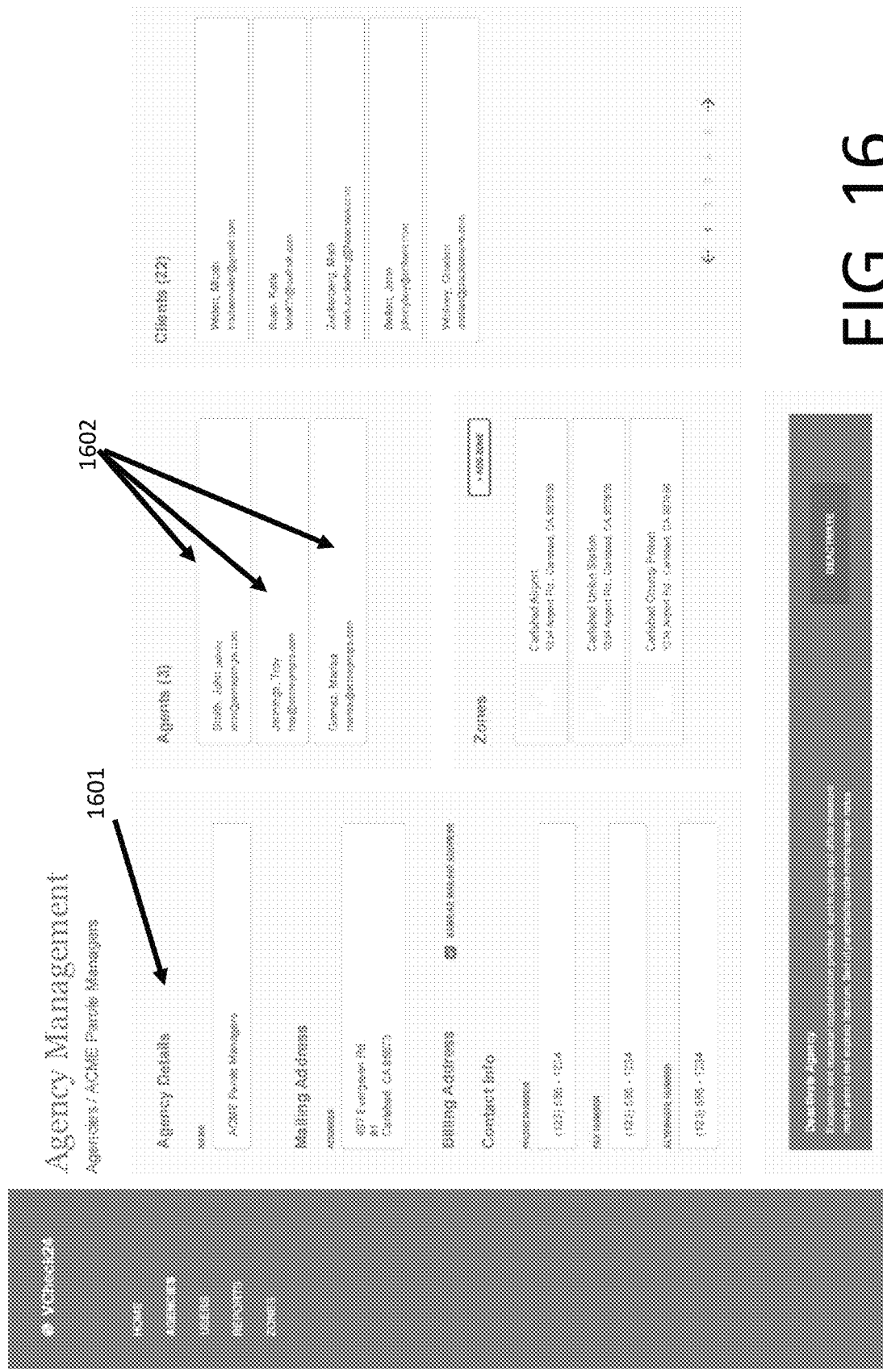
FIG. 16 is an image of an embodiment of the Vcheck platform display of the Vcheck platform's agency account information

The Vcheck platform may be overseen by one or more administrators. Administrators have greater read/write access to the Vcheck platform. For example, the Administrator can view the data associated with each of the separate agents and further drill down into the Agent's profiles, and add/delete agents. For example, FIGS. 14-16 provides examples of the Vcheck platform database of companies (agencies) 1601 that have agents 1602 and the adding or deleting of those companies or their respective agents.

Figure 17:
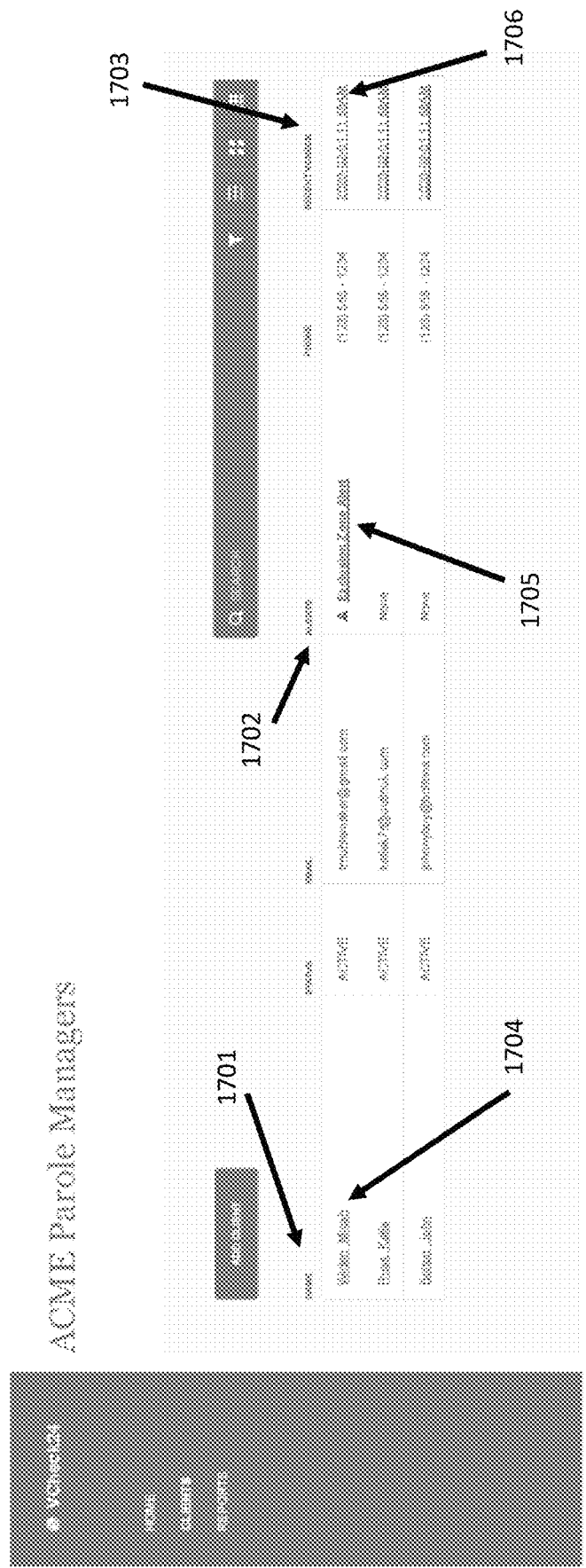
FIG. 17 is an image of an embodiment of the Vcheck platform display of the Vcheck platform's client information list utilized by agents to monitor clients' behaviors.
Figure 18:
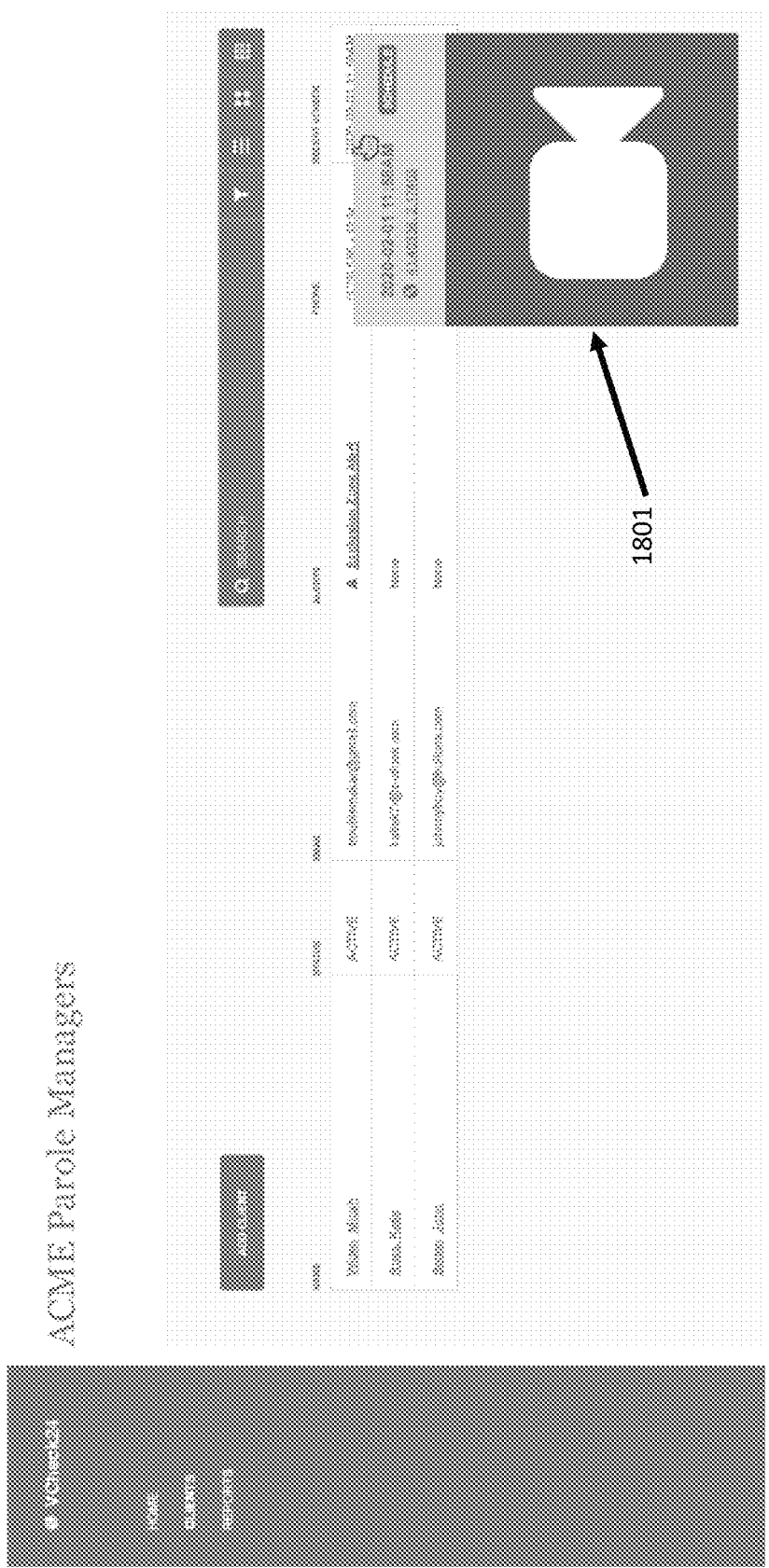
FIG. 18 is an image of an embodiment of the Vcheck platform display of a client's check-in video
Figure 19:
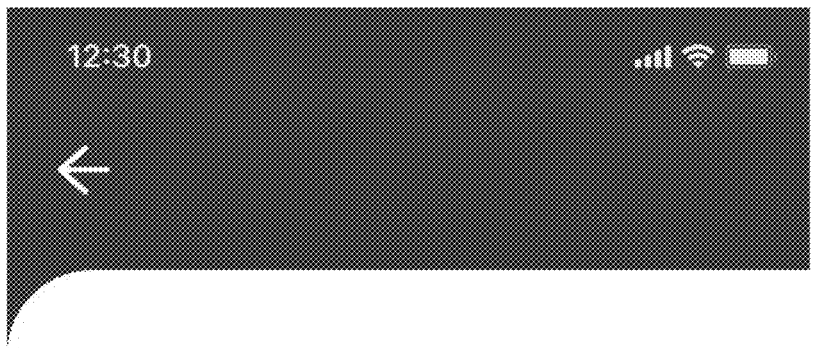
FIG. 19 is an image of an embodiment of the Vcheck platform display of the Vcheck platform's agent/client messaging tool.
Figure 19:
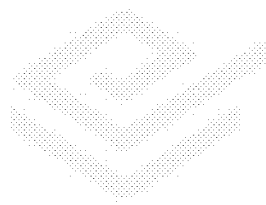
Figure 20:
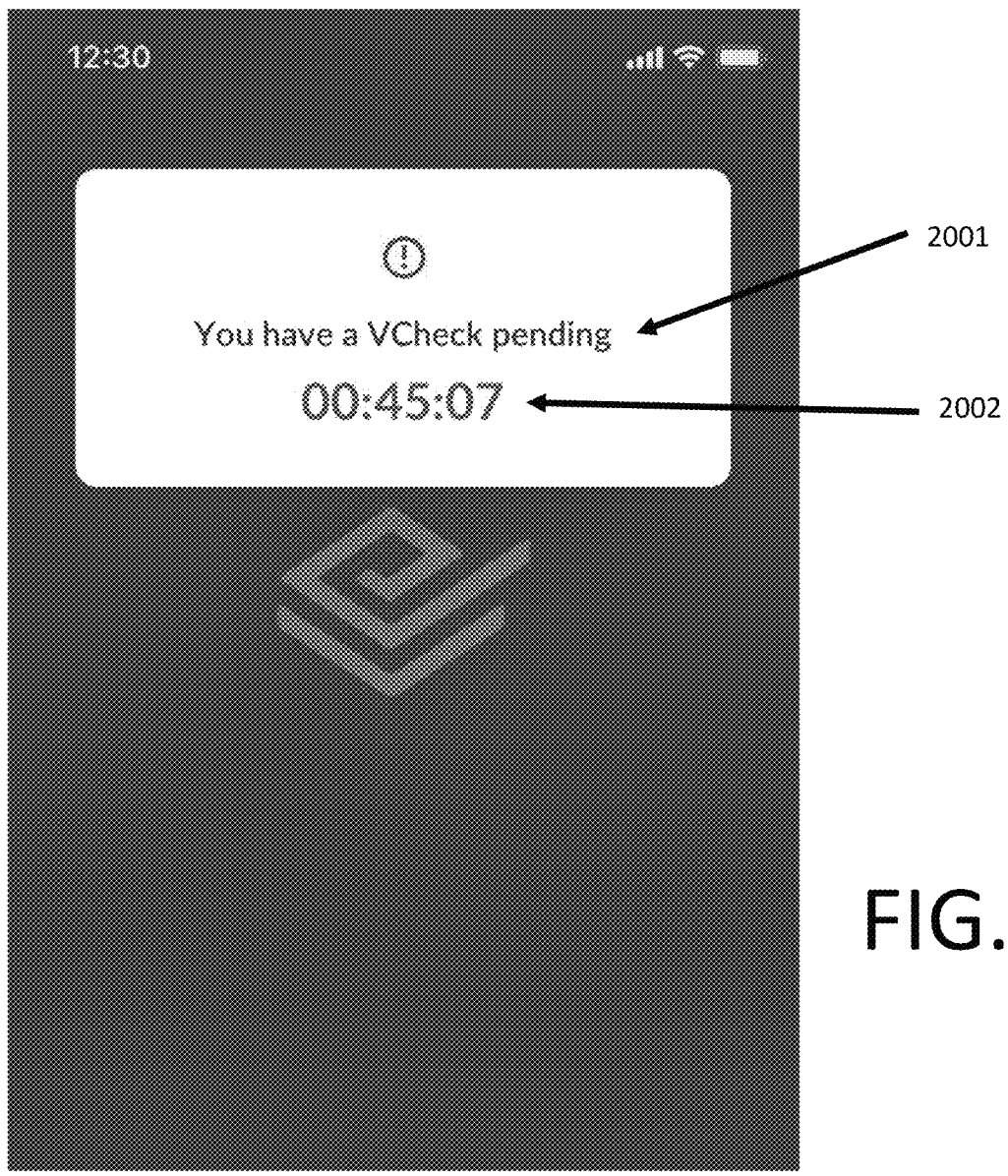

As shown in FIG. 17, the when viewing the Client page, an agent may expand the viewable fields of client information to include not only the client's name 1701, but also information about the client's actions, such as an alerts field 1702 and a check-in field 1703. In FIG. 17, client 1704 is shown as having violated an exclusion zone, and an alert indicating the exclusion zone violation 1705 is indicated by the Vcheck platform. The agent is able to click on the client's recent check-in 1706 to bring up the video check-in 1801 from the client as shown in FIG. 18. The agent may also select the client's phone number to bring up a text message/DM function within the Vcheck platform. In an alternate embodiment, the phone number may be replaced with a "contact" button and the Vcheck platform hides the actual contact information in the background. As shown in FIG. 19, the messaging function allows the agent and client to message each other in the same manner as a traditional text message or direct message system. However, the messages sent through the Vcheck platform are each stored within the Vcheck platform and associated with the respective client to maintain an accurate and complete log of communications. Thus, if evidence is needed for a court hearing, for example, the Vcheck platform will have stored the relevant data respecting the zone violation, the alert, the agent's attempts to contact the client, and the following communications with the client, and can generate a succinct report of that information in a reliable way for the court hearing.

The client may use the client's mobile device to complete check-ins though the Vcheck app. After initially downloading the Vcheck app, the client may conduct a series of basic set-up procedures. For example, the Vcheck app may prompt the client to acknowledge and accept a number of permissions, such as granting the Vcheck app permission to access the microphone, phone sensors, camera, memory, location data, and other device features and functions. The Vcheck app may also request confirmation that the client agrees to the Vcheck platform collecting and storing biometric data.

With reference to FIGS. 20-25, once the initial application process is complete, the client may perform check-ins through the Vcheck app. The Vcheck app provides the client with a notification 2001 that the client must perform a check-in. The Vcheck app may display the time limit 2002, for performing the check-in, 0:45:07 for example. The time limit may be set by the agent prior to the client receiving the alert for the check-in. If the client fails complete the check-in properly within the time limit, the Vcheck app sends a notification to the Vcheck platform of the failure. To begin, the client is instructed to press the start button 2003 (for example, the camera icon 2004).

Figure 21:
Figure 21:
Figure 22:
Figure 23:
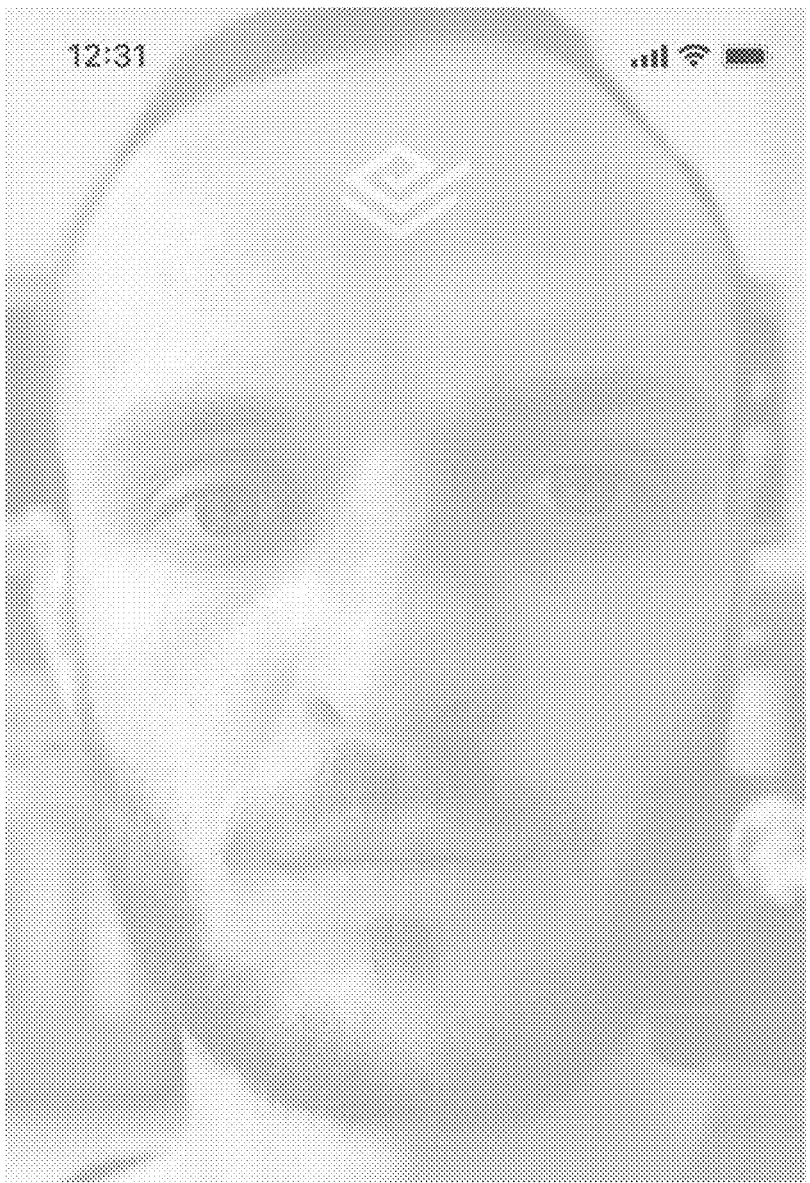
Figure 24:
Figure 24:
Figure 24:
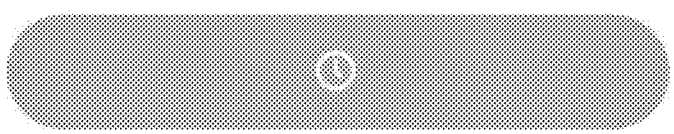
Figure 25:
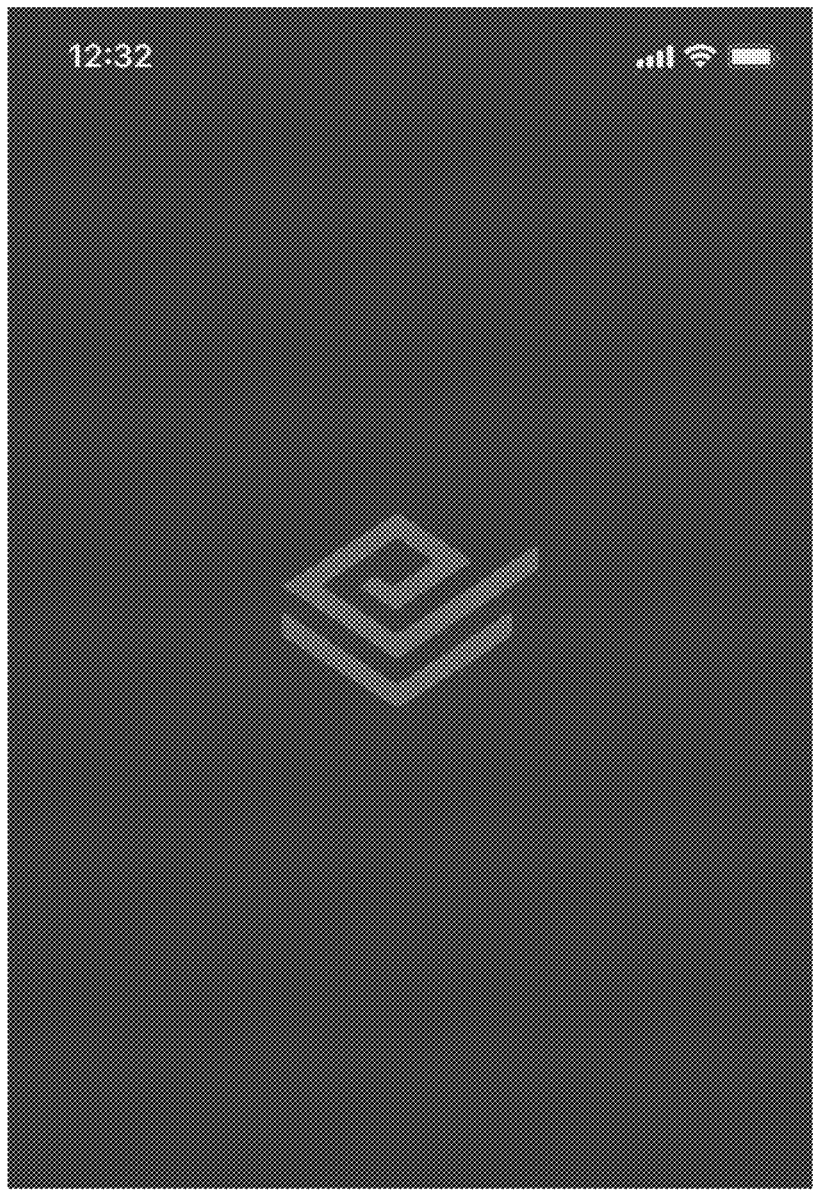
Figure 25:
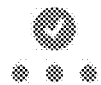
Figure 25:
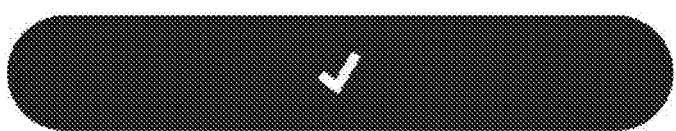
Figure 26:
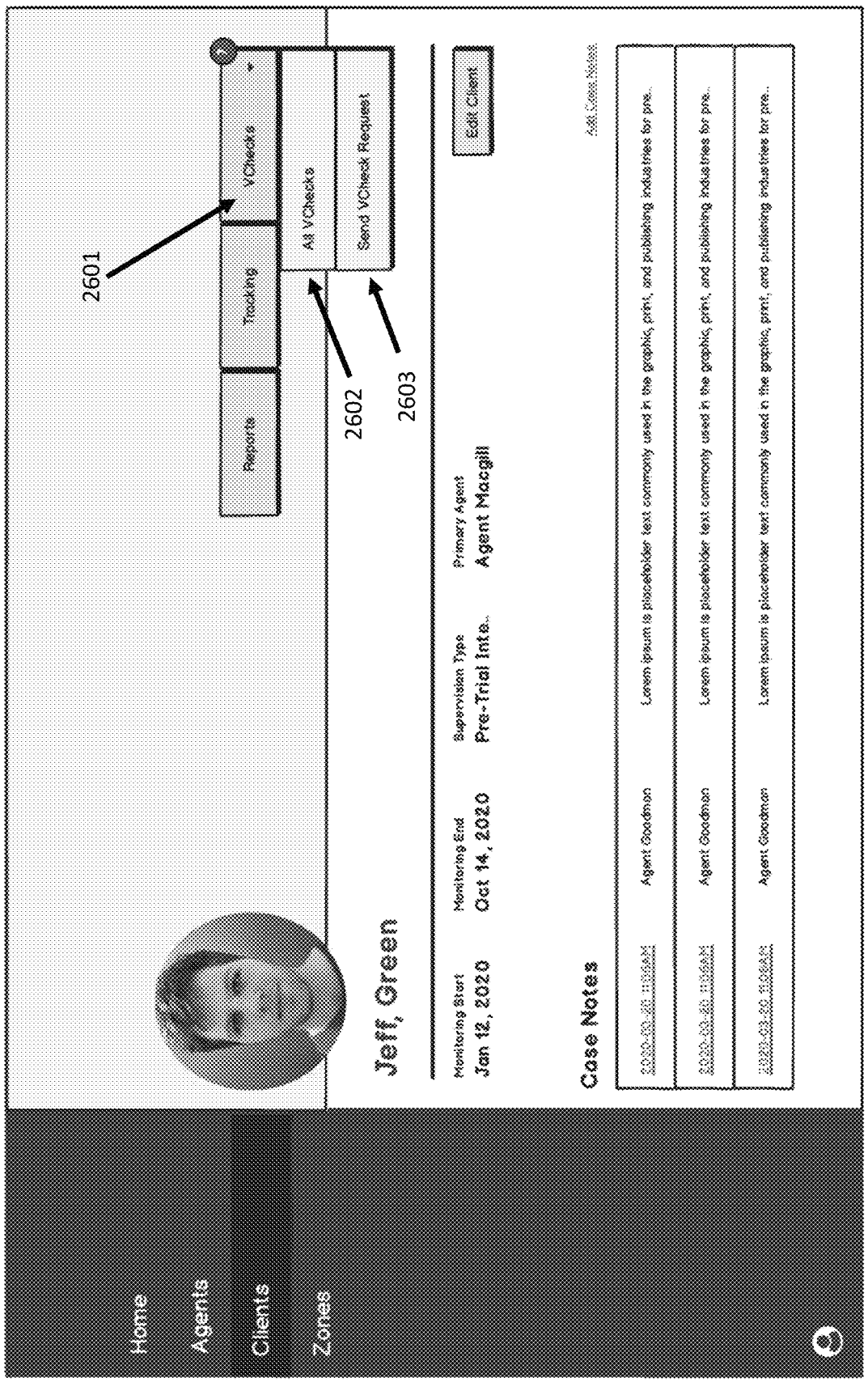
FIG. 26 is an image of an embodiment of the Vcheck platform's display of client information pertaining to a particular client.
Figure 27:
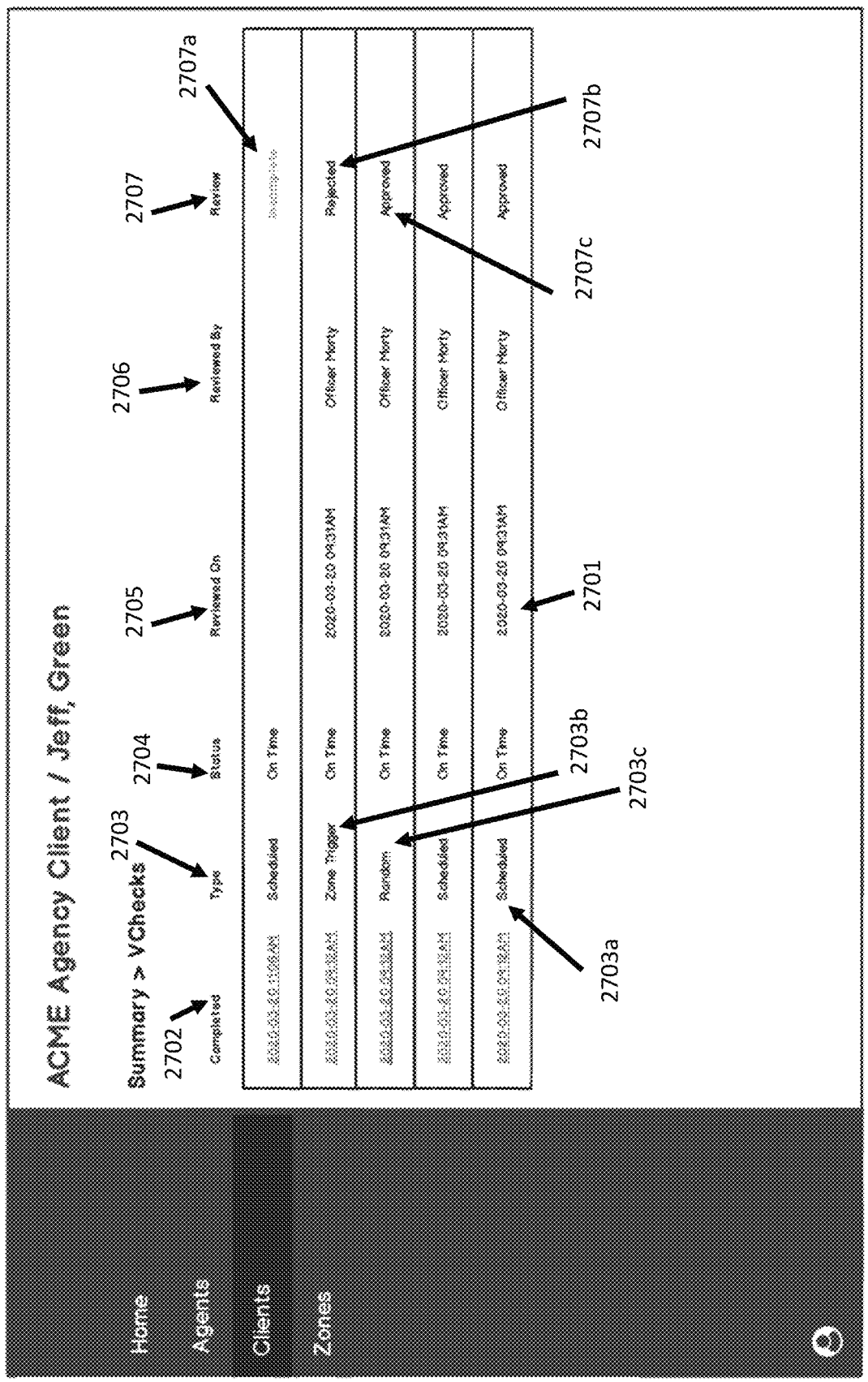
FIG. 27 is an image of an embodiment of the Vcheck platform's display of client information pertaining to the Vcheck platform's saved check-ins for a particular client.
Figure 28:
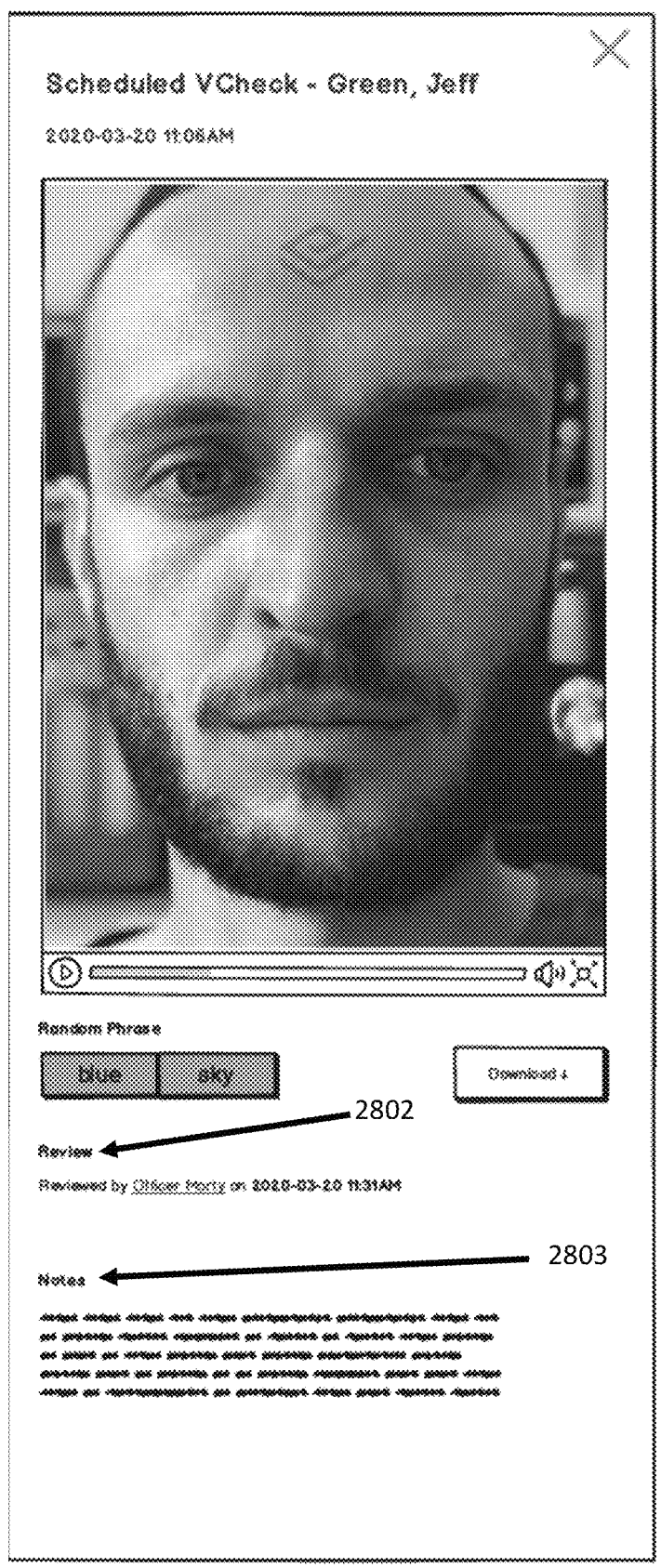
FIG. 28 is an image of an embodiment of the Vcheck platform's display of a particular video check-in of a client stored on the Vcheck platform.
Figure 29:
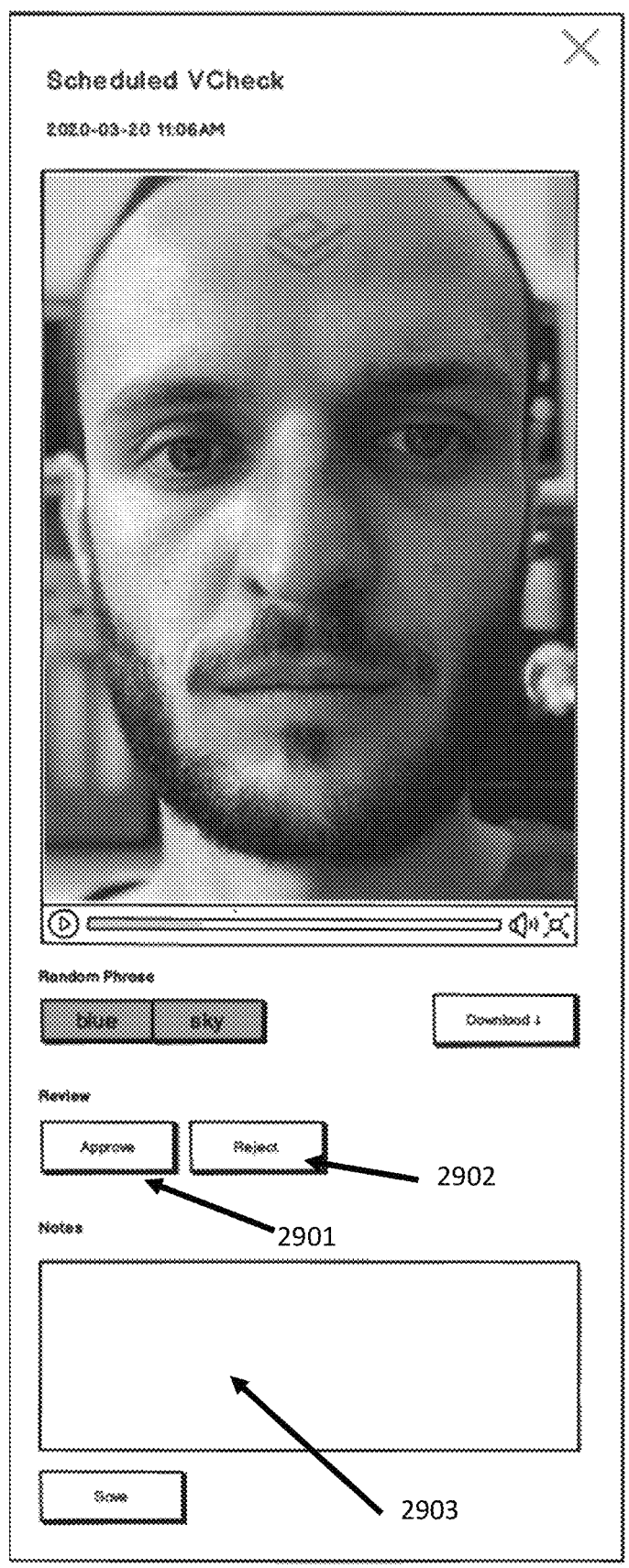
FIG. 29 is an image of an embodiment of the Vcheck platform's display of a system for the agent to input data respecting a saved check-in for a particular client.

Upon selecting the start button, the Vcheck app activates the front facing camera of the client's mobile device. The client is prompted to image themselves as shown in FIG. 21. The Vcheck app may capture a still image to be used with facial recognition software and check the image against a previously stored image of the client in the Vcheck platform. The Vcheck app may also continually record video during the check-in process. After beginning the check-in the client may be prompted to perform an action. For example, the Vcheck app may instruct the client to show their profile, blink slowly, or make an utterance. As shown in FIG. 22, the Vcheck app may issue a prompt 2201 for the client to say their name. It may then issue a prompt 2301 for the client to state the client's current location. It may then issue a prompt 2401 for the client to repeat a particular word or phrase. The Vcheck app may stream the check-in to the Vcheck platform for recording by the Vcheck platform. Alternatively, the check-in may be recorded locally by the Vcheck app and uploaded upon completion. The Vcheck app may provide feedback (e.g. a message 2501) to the client to confirm that the check-in was successfully transmitted to the Vcheck platform.

With reference to FIGS. 26-29, the agent may review a client's recorded check-ins. For example, the client's profile may include a button or menu 2601 relating to the client's check-ins. The agent may select to receive a list of the client's check-ins 2602, or may instruct the Vcheck platform to send a request for the client to perform a check-in presently 2603. Selecting the list 2602 may bring up a list of past recorded check-ins. The list may include fields such as the date and time the check-in occurred 2702, the type of check in 2703, such as whether the check-in was a pre-scheduled check-in 2703*a*, a check-in that was triggered by the client entering or exiting a zone of interest 2703*b*, or a randomly demanded check-in 2703*c*. The list may include an indication of whether the check-in was completed on time 2704 (or late, delayed, or missed, for example), the date and time that the agent reviewed the check-in 2705, the reviewing agent 2706, and the status of the review 2707 (such as incomplete 2707*a*, rejected, 2707*b*, or approved 2707*c*).

To review a check-in, the agent may select, for example, the date and time of the check-in which the Vcheck platform may link to the recorded check-in. The link may provide a pop-up 2801 of the check-in. The check in may show the video, the prompts to be followed by the client (such as the phrase to be spoken during the check-in), any notes about the check-in, and information about the reviewing agent. The agent may insert or update information about the check-in by selecting different fields. For example, the agent may select the review field 2802 to bring up approve/reject options 2901, 2902, or may click on the Notes field 2803, to add notes in an editable notes box 2903.

Figure 30:
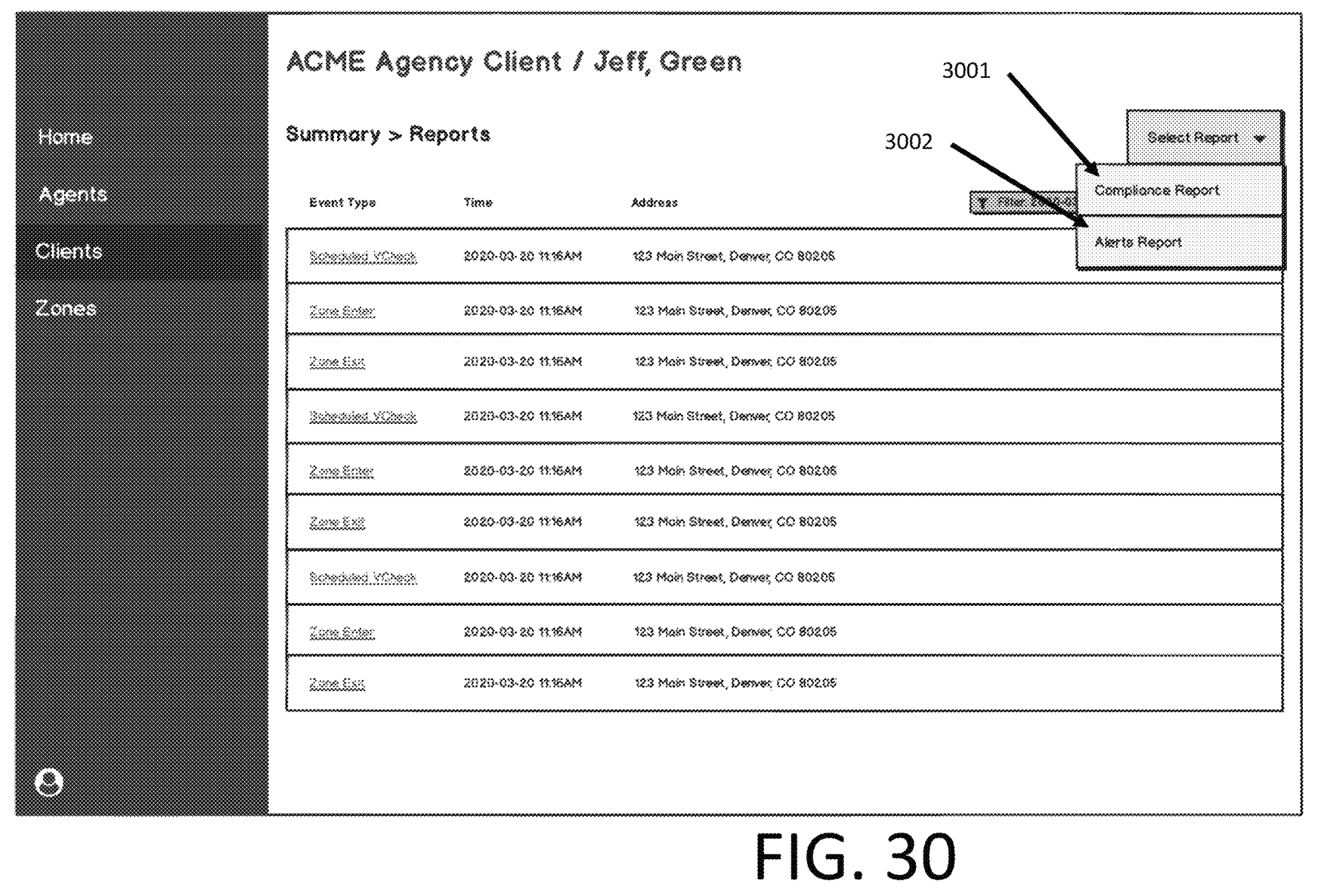

The agent may also select the Reports button 103 to bring up a report generation page as shown in FIG. 30. The agent may select from a number of available reports, such as a compliance report 3001 or an alerts report 3002, or other desired report. For example the compliance report compiles all of the client's check-ins and displays whether the check-ins complied with the agent's set parameters for the client. The alerts report segregates each time the Vcheck platform registered an alert, such as a missed check-in or zone of interest violation and provides only those incidents to the agent.

Figure 31:
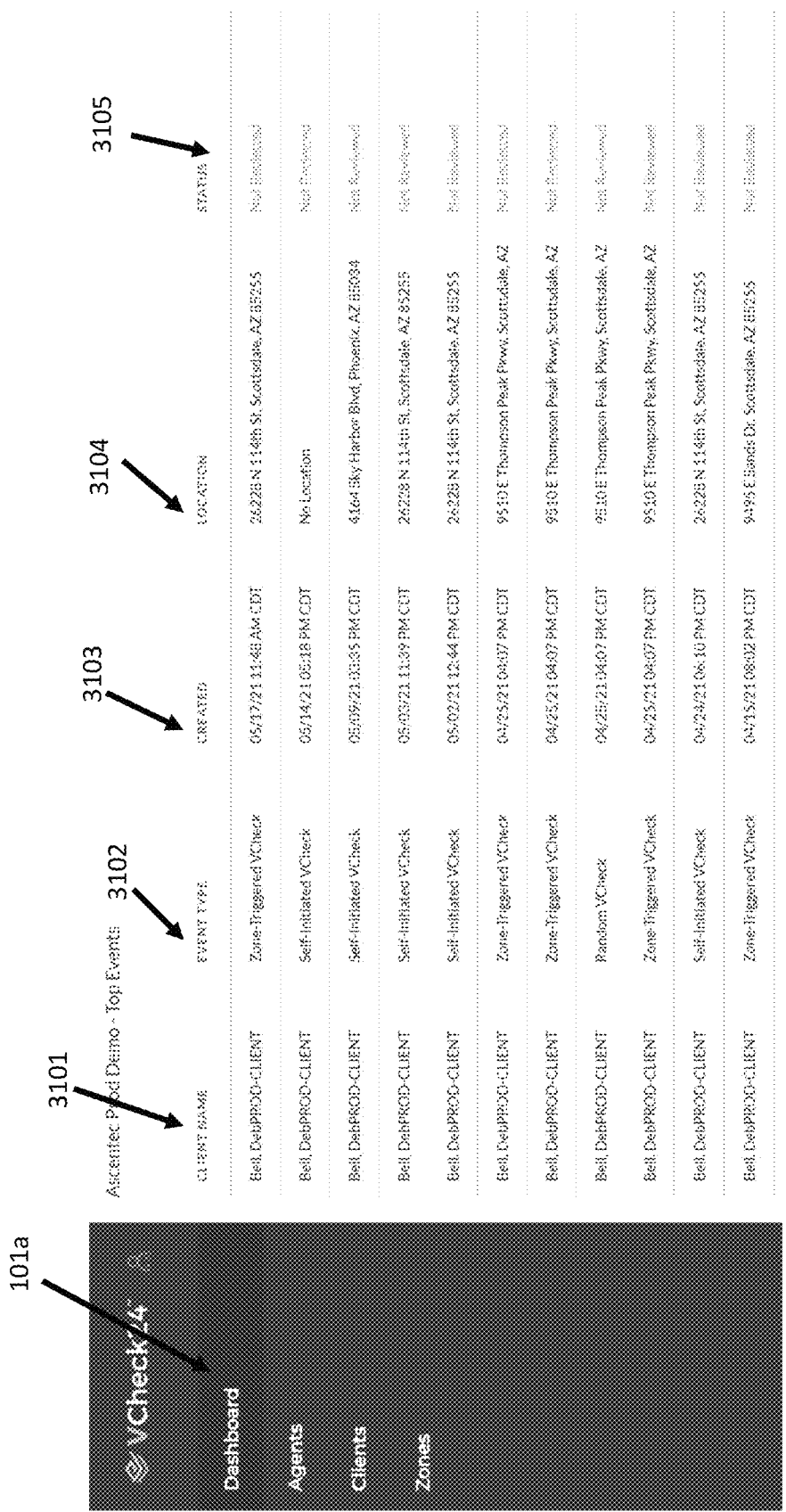
FIG. 31 is an image of an embodiment of the Vcheck platform's display of an agent dashboard landing page.

In one embodiment, the home tab is the agent's dashboard. For example, in FIG. 31, the dashboard 101*a* brings up a list of the clients that the agent is responsible for monitoring. The list provides the client names 3101, discrete events 3102 associated with the client and the time the event occurred 3103 along with the location of the event 3104. The agent is also provided with an indication as to whether the event has been verified 3105, that is, whether an agent has reviewed the event and confirmed its accuracy. Clicking on a table entry will bring up the event and allow the agent to review the event and change the status, for example to verified or rejected. That allows an agent to systematically keep track of the clients and the work the agent has completely and has yet to complete.

Figure 32:
FIG. 32 is an image of an embodiment of the Vcheck platform's display of a global zones library.

One embodiment of the Vcheck platform includes a Zones tab 3201 as shown in FIG. 32. The Zones tab provides Agents with access to a library of predefined zones of interest 3202, sometimes referred to a global zones as they may generally be globally applicable to a multitude of different clients. The zones may be provided in a list and identified by name 3203 and address. The agent may use the library of zones to populate zones of interest for multiple different clients without the need to individually define zones of interest from scratch for each client. Generally the library of zones may be frequently utilized zones of interest such as an airport, hospital, school, halfway house, treatment center, etc. While the zones are save with predefined parameter, the agent may click on a zone to edit the zone in a manner as similarly described with respect to FIGS. 6 and 7.

Although the present invention has been described in terms of the preferred embodiments, it is to be understood that such disclosure is not intended to be limiting. Various alterations and modifications will be readily apparent to those of skill in the art. Accordingly, it is intended that the appended claims be interpreted as covering all alterations and modifications as fall within the spirit and scope of the invention.

What is claimed is:

1. A method for providing a computerized tracking system utilizing a client mobile device and a Vcheck platform stored on a remote computer comprising:
    downloading a Vcheck application to the client mobile device;
    within the Vcheck platform, creating a client account;
    linking the Vcheck application to the client account on the Vcheck platform;
    within the Vcheck platform, defining at least one zone of interest;
    within the Vcheck platform, defining client parameters comprising at least the following:
    a biometric parameter corresponding to a client;
    a date on which a client must check-in is required;
    a time range during which the client must check-in is required;
    a countdown timer comprising a set time period during which the client check-in is required wherein the set time period decreases upon a determination that the client mobile device has transitioned into or out of the at least one zone of interest;
    within the Vcheck platform, continually monitoring the client parameters and, when the client parameters indicate that the client check-in is required, using the Vcheck platform to automatically transmit to the client mobile device a notification to provide the client check-in;
    storing a copy of the notification on the Vcheck platform in association with the client account;
    within the Vcheck platform, during the time range or the set time period within which the client check-in is required, monitoring the Vcheck platform for receipt of the required client check-in from the Vcheck application;
    on the client mobile device,
    receiving the notification that the client check-in is required and thereafter opening the Vcheck application and utilizing the Vcheck application to record the client check-in wherein the client check-in comprises recording the date, time, and location of the client check-in;
    checking for signal connectivity to transmit the recorded client check-in to the Vcheck platform;
    upon determining a lack of signal connectivity, storing in association with the client check-in an indication of the lack of signal connectivity and a time during which there existed the lack of signal connectivity; and
    upon confirming signal connectivity, transmitting the recorded client check-in, including the indication of the lack of signal connectivity to the Vcheck platform;
    within the Vcheck platform, receiving the recorded client check-in, automatically associating the recorded client check-in with the client account of the client, cross-referencing the recorded client check-in with one or more of the client parameters;
    cross-referencing the time during which there existed the lack of signal connectivity; and
    recording within the Vcheck platform a status of the client check-in.

2. The method as in claim 1 wherein the status of the client check-in comprises at least one of the following:
    an indication that the client check-in was acceptable and timely when the recorded client check-in meets the client parameters and was received by the Vcheck platform within the time range or the set time period;
    an indication that the client check-in was unacceptable when the recorded client check-in does not meet one or more of the client parameters; and
    an indication that the client check-in was acceptable but delayed when the recorded client check-in meets the biometric client parameters but was received by the Vcheck platform outside of a time period for receipt set by the Vcheck platform;
    wherein when the cross-referencing of the time during which there existed the lack of signal connectivity and the time indicates that the lack of signal connectivity was during the set time period, recording the client check-in as acceptable and timely.

3. The method as in claim 1 wherein, during checking for signal connectivity to transmit the recorded client check-in to the Vcheck platform, determining that there is no signal connectivity, storing the recorded client check-in locally on the mobile device along with data indicating the lack of signal connectivity, periodically checking for signal connectivity, and, upon confirming signal connectivity, transmitting the recorded client check-in to the Vcheck platform along with the data indicating the lack of signal connectivity.

4. The method as in claim 1 further comprising:
    the Vcheck application performing the steps of
    monitoring settings of the client mobile device having a GPS function and a cellular transmission function;
    when the GPS function or cellular transmission function is disabled, automatically recording disable data in a form of at least a date and time during which the corresponding function was disabled and an identity of the corresponding function;
    when, after being disabled, the corresponding function is enabled, recording enable data in a form of at least a date and time that the corresponding function was enabled and the identity of the corresponding function; and
    when the client mobile device is connected to a network, automatically transmitting the disable data and the enable data to the Vcheck platform and storing the disable data and the enable data in the Vcheck platform in association with the client.

5. The method of claim 1 wherein the client check-in further comprises:
    automatically activating a front facing camera of the client mobile device;
    capturing an image of the client using the front facing camera;

automatically performing facial recognition based on the captured image of the client and a previously saved image of the client and recording an indication of a result of comparison;
video recording the client using the front facing camera;
providing instructions through the Vcheck application for the client to perform an action;
capturing the client performance of the instructed action;
saving the client check-in on the Vcheck platform;
updating the Vcheck platform with a status indicating whether the client check-in was acceptable or unacceptable.

6. The method as in claim 5 further comprising transmitting an alert to an agent when the client check-in is unacceptable.

7. The method as in claim 5 wherein the client check-in further comprises establishing two-way video communication between the Vcheck application and an agent computer.

8. The method for providing a computerized tracking system utilizing the client mobile device and an agent database stored on the remote computer as in claim 1 further comprising:
programming the agent database with the client parameter that is an exclusion zone comprising a geographical area that the client mobile device is restricted from entering;
within the Vcheck platform, receiving from the Vcheck application location data corresponding to a location of the mobile device;
within the Vcheck platform, comparing the location data with the exclusion zone and, when the comparison indicates that the mobile device is within the exclusion zone, issuing a command to the mobile device to perform the client check-in;
receiving at the mobile device the command to perform the client check-in; and
recording via the Vcheck application the client check-in comprising recording the date, time, and location of the mobile device during the recording and a video of the client.

9. The method of claim 1 further comprising: assigning a unique code to the client account;
downloading the Vcheck application to the client mobile device;
linking the Vcheck application on the client mobile device to the client account using the unique client code;
prohibiting additional Vcheck applications from accessing the client account.

10. A method for providing a computerized tracking system utilizing a client mobile device and a Vcheck platform stored on a remote computer comprising:
downloading a Vcheck application to the client mobile device;
within the Vcheck platform, creating a client account;
linking the Vcheck application to the client account on the Vcheck platform;
within the Vcheck platform, defining at least one zone of interest;
within the Vcheck platform, defining client parameters comprising at least the following:
a biometric parameter corresponding to a client;
a date on which a client must check-in is required;
a time range during which the client check-in is required;
a countdown timer comprising a set time period during which the client check-in is required wherein the set time period decreases upon a determination that the client mobile device has transitioned into or out of the at least one zone of interest;
within the Vcheck platform, continually monitoring the client parameters and, when the client parameters indicate that the client check-in is required, using the Vcheck platform to automatically transmit to the client mobile device a notification to provide the client check-in; and
using the Vcheck application to perform the following steps:
step 1, record location data corresponding to a location of the client mobile device at an instant in time;
step 2, check for connectivity between the Vcheck application and the Vcheck platform;
step 3, when there is connectivity, proceeding to step 5 without performing step 4 and when there is a lack of connectivity, proceeding to step 4;
step 4, storing the recorded location data on the client mobile device along with delay data, the delay data indicating that at the time the recorded location data was recorded there was the lack of connectivity;
step 5, checking for stored recorded location data that has not been transmitted to the Vcheck platform, and transmitting the recorded location data and the stored recorded location data that has not been transmitted to the Vcheck platform along with the delay data;
step 6, on a periodic basis, automatically repeating the steps 1-5 when the Vcheck application is running on the client mobile device;
step 7, utilizing the delay data and the client parameters to determine whether the recorded location data was recorded at a time that was in compliance with the client parameters; and
step 8, automatically identifying the recorded location data as an acceptable client check-in when the recorded location data was recorded at the time that was in compliance with the client parameters.

11. The method as in claim 10 further comprising:
storing a zone of interest on the Vcheck platform and associating the zone of interest with the client account wherein the zone of interest comprises a geographic area;
utilizing the Vcheck platform performing the steps of
step a, receiving the location data and the associated delay data;
step b, organizing the location data sequentially in time and cross-referencing the received location data against the zone of interest.

12. The method of claim 11 further comprising:
defining the zone of interest as an exclusion zone;
within the Vcheck platform, automatically generating an alert when the cross-referencing step indicates that the location data corresponds to a location within the zone of interest;
utilizing the Vcheck platform to automatically transmit a message to the Vcheck application with instructions to perform the client check-in in response to the alert;
storing on the Vcheck platform and indication of the alert that is visible within a user interface of the Vcheck platform;
utilizing the Vcheck platform to automatically transmit a message to an agent computer with an indication of an identity of the client and an indication of the alert in response to the alert.

13. The method of claim 11 further comprising:
defining the zone of interest as an inclusion zone;

within the Vcheck platform, automatically generating an alert when the cross-referencing step indicates that the location data corresponds to a location outside of the zone of interest;

utilizing the Vcheck platform to automatically transmit a message to the Vcheck application with instructions to perform the client check-in in response to the alert;

storing on the Vcheck platform and indication of the alert that is visible within a user interface of the Vcheck platform;

utilizing the Vcheck platform to automatically transmit a message to an agent computer with an indication of an identity of the client and an indication of the alert in response to the alert.

14. The method as in claim 10 wherein a base frequency for the periodic basis is a highest frequency available within the Vcheck application and further comprising:

the Vcheck platform comparing successive location data;

the Vcheck platform incrementing a counter every time successive location data remains within a predetermined geographic zone;

upon reaching a first predetermined value of the counter, the Vcheck platform transmits an instruction to the Vcheck application to decrease a frequency of the periodic basis.

15. The method as in claim 14 wherein, when, after receiving successive location data that remains within the predetermined geographic zone, the Vcheck platform receives location data that is outside of the predetermined geographic zone and the Vcheck platform transmits an instruction to the Vcheck application to increase the frequency of the periodic basis to the base frequency.

16. The method as in claim 10 wherein a base frequency for the periodic basis is every three minutes.

* * * * *